United States Patent
Marrone et al.

(10) Patent No.: US 11,582,129 B2
(45) Date of Patent: *Feb. 14, 2023

(54) MONITORING OVERLAY NETWORKS

(71) Applicant: Tempered Networks, Inc., Seattle, WA (US)

(72) Inventors: Nicholas Anthony Marrone, Seattle, WA (US); Bryan David Skene, Seattle, WA (US); Ludwin Fuchs, Seattle, WA (US); Jeffrey Scott Hussey, Seattle, WA (US)

(73) Assignee: Tempered Networks, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/221,145

(22) Filed: Dec. 14, 2018

(65) Prior Publication Data

US 2019/0372876 A1 Dec. 5, 2019

Related U.S. Application Data

(63) Continuation of application No. 15/994,760, filed on May 31, 2018, now Pat. No. 10,158,545.

(51) Int. Cl.
*H04L 43/0876* (2022.01)
*H04L 12/66* (2006.01)
(Continued)

(52) U.S. Cl.
CPC .......... *H04L 43/0876* (2013.01); *H04L 12/66* (2013.01); *H04L 41/06* (2013.01);
(Continued)

(58) Field of Classification Search
None
See application file for complete search history.

(56) References Cited

U.S. PATENT DOCUMENTS

| 5,835,727 A | 11/1998 | Wong et al. |
| 6,158,010 A * | 12/2000 | Moriconi ............... G06F 21/552 709/223 |

(Continued)

FOREIGN PATENT DOCUMENTS

| WO | 2007038872 A1 | 4/2007 |
| WO | 2008039506 A2 | 4/2008 |

(Continued)

OTHER PUBLICATIONS

Office Communication for U.S. Appl. No. 16/562,258 dated Oct. 22, 2019, pp. 1-10.

(Continued)

*Primary Examiner* — Diane L Lo
(74) *Attorney, Agent, or Firm* — John W. Branch; Branch Partners PLLC

(57) ABSTRACT

Embodiments are directed to managing communication over one or more networks. A monitoring engine may be instantiated to perform actions including receiving network traffic from a physical network that may be associated with network addresses of the physical network. The monitoring engine may analyze the network traffic to associate activity with gateway identifiers (GIDs) associated with gateway computers in an overlay network such that the GIDs are separate from the network addresses. The monitoring engine may be arranged to monitor the network traffic based on monitoring rules. The monitoring engine may provide metrics associated with the gateway computers based on the monitoring of the network traffic. The monitoring engine may compare the metrics to event rules. The monitoring engine may generate events based on affirmative results of the comparison. The events may be mapped to actions based on characteristics of the events and executed.

20 Claims, 10 Drawing Sheets

(51) Int. Cl.
| | |
|---|---|
| *H04L 65/102* | (2022.01) |
| *H04L 9/40* | (2022.01) |
| *H04L 45/64* | (2022.01) |
| *H04L 41/0893* | (2022.01) |
| *H04L 43/08* | (2022.01) |
| *H04L 41/06* | (2022.01) |
| *H04L 67/1001* | (2022.01) |
| *H04L 43/16* | (2022.01) |

(52) U.S. Cl.
CPC .......... *H04L 41/0893* (2013.01); *H04L 43/08* (2013.01); *H04L 45/64* (2013.01); *H04L 63/20* (2013.01); *H04L 65/102* (2013.01); *H04L 67/1001* (2022.05); *H04L 43/16* (2013.01)

(56) References Cited

U.S. PATENT DOCUMENTS

| | | | |
|---|---|---|---|
| 6,981,156 B1 | 12/2005 | Stern et al. | |
| 7,209,956 B2 | 4/2007 | Mache | |
| 7,324,533 B1 | 1/2008 | DeLiberato et al. | |
| 7,373,660 B1 | 5/2008 | Guichard et al. | |
| 7,395,349 B1 | 7/2008 | Szabo et al. | |
| 7,796,593 B1 | 9/2010 | Ghosh et al. | |
| 7,881,199 B2 | 2/2011 | Krstulich | |
| 7,996,894 B1 | 8/2011 | Chen et al. | |
| 8,224,971 B1 | 7/2012 | Miller et al. | |
| 8,429,400 B2 | 4/2013 | Khalid et al. | |
| 8,489,701 B2 | 7/2013 | Manion et al. | |
| 8,607,301 B2 | 12/2013 | Carrasco | |
| 8,630,183 B2 | 1/2014 | Miyata | |
| 8,832,211 B1 | 9/2014 | Lebedev et al. | |
| 8,886,827 B2 | 11/2014 | Goel et al. | |
| 8,959,513 B1 | 2/2015 | Swaminathan | |
| 9,264,522 B1 | 2/2016 | Reeves et al. | |
| 9,774,586 B1 | 9/2017 | Roche et al. | |
| 10,158,545 B1* | 12/2018 | Marrone | H04L 43/0876 |
| 2002/0026532 A1 | 2/2002 | Maeda et al. | |
| 2002/0073182 A1 | 6/2002 | Zakurdaev et al. | |
| 2002/0143855 A1 | 10/2002 | Traversal et al. | |
| 2003/0061479 A1 | 3/2003 | Kimura | |
| 2003/0081620 A1 | 5/2003 | Danner et al. | |
| 2003/0123436 A1 | 7/2003 | Joseph et al. | |
| 2004/0024905 A1 | 2/2004 | Liao et al. | |
| 2004/0143628 A1 | 7/2004 | Bradford et al. | |
| 2004/0268121 A1 | 12/2004 | Shelest et al. | |
| 2005/0014500 A1 | 1/2005 | Muhonen et al. | |
| 2005/0052999 A1 | 3/2005 | Oliver et al. | |
| 2005/0265355 A1 | 12/2005 | Havala et al. | |
| 2006/0190458 A1 | 8/2006 | Mishina et al. | |
| 2006/0233166 A1* | 10/2006 | Bou-Diab | H04L 67/02 370/389 |
| 2007/0019641 A1 | 1/2007 | Pai et al. | |
| 2007/0081530 A1 | 4/2007 | Nomura et al. | |
| 2007/0226781 A1 | 9/2007 | Chen et al. | |
| 2007/0230352 A1 | 10/2007 | Kokku et al. | |
| 2007/0258440 A1 | 11/2007 | Watanabe | |
| 2008/0072282 A1 | 3/2008 | Willis et al. | |
| 2008/0082823 A1 | 4/2008 | Starrett et al. | |
| 2008/0151916 A1 | 6/2008 | Jetcheva et al. | |
| 2008/0232360 A1 | 9/2008 | Mihaly et al. | |
| 2008/0288614 A1 | 11/2008 | Gil et al. | |
| 2008/0307519 A1 | 12/2008 | Curcio et al. | |
| 2009/0010168 A1 | 1/2009 | Yurchenko et al. | |
| 2009/0034738 A1 | 2/2009 | Starrett | |
| 2009/0059906 A1 | 3/2009 | Cullen | |
| 2009/0129374 A1 | 5/2009 | Yurchenko et al. | |
| 2009/0210518 A1 | 8/2009 | Verma et al. | |
| 2009/0210541 A1 | 8/2009 | Chandolu et al. | |
| 2009/0310518 A1 | 12/2009 | Jayaram et al. | |
| 2010/0014533 A1 | 1/2010 | Hirano et al. | |
| 2010/0024026 A1 | 1/2010 | Ylonen et al. | |
| 2010/0027442 A1 | 2/2010 | Chockler et al. | |
| 2010/0042747 A1 | 2/2010 | Hascalovici et al. | |
| 2010/0214959 A1 | 8/2010 | Kuehnel et al. | |
| 2010/0218235 A1 | 8/2010 | Ganot | |
| 2010/0254395 A1 | 10/2010 | Smith et al. | |
| 2011/0016509 A1 | 1/2011 | Huang et al. | |
| 2011/0035466 A1 | 2/2011 | Panirahi | |
| 2011/0090892 A1 | 4/2011 | Cooke | |
| 2011/0103393 A1 | 5/2011 | Meier et al. | |
| 2011/0141881 A1 | 6/2011 | Joshi et al. | |
| 2012/0110203 A1 | 5/2012 | Ozawa | |
| 2012/0163196 A1 | 6/2012 | Jansen et al. | |
| 2012/0304243 A1 | 11/2012 | Li et al. | |
| 2013/0018993 A1 | 1/2013 | Hui et al. | |
| 2013/0046414 A1 | 2/2013 | Ree | |
| 2013/0083725 A1 | 4/2013 | Mallya et al. | |
| 2013/0198830 A1 | 8/2013 | Nemoto et al. | |
| 2013/0254264 A1 | 9/2013 | Hankinson et al. | |
| 2013/0283364 A1 | 10/2013 | Chang et al. | |
| 2014/0026207 A1 | 1/2014 | Wang et al. | |
| 2014/0133354 A1 | 5/2014 | Scharf et al. | |
| 2014/0150070 A1 | 5/2014 | Peterson | |
| 2014/0223507 A1 | 8/2014 | Xu | |
| 2014/0282817 A1 | 9/2014 | Singer et al. | |
| 2014/0282850 A1 | 9/2014 | Mattes et al. | |
| 2014/0307744 A1 | 10/2014 | Dunbar et al. | |
| 2014/0348131 A1 | 11/2014 | Duan et al. | |
| 2015/0024677 A1 | 1/2015 | Gopal et al. | |
| 2015/0046997 A1 | 2/2015 | Gupta et al. | |
| 2015/0057766 A1 | 2/2015 | Ejiri et al. | |
| 2015/0067033 A1 | 3/2015 | Martinsen et al. | |
| 2015/0124823 A1 | 5/2015 | Pan et al. | |
| 2015/0135259 A1 | 5/2015 | Ilyadis et al. | |
| 2015/0281074 A1 | 10/2015 | Kubota | |
| 2015/0365316 A1 | 12/2015 | Liao et al. | |
| 2015/0372828 A1 | 12/2015 | Hao et al. | |
| 2016/0028624 A1 | 1/2016 | Song et al. | |
| 2016/0036861 A1 | 2/2016 | Mattes et al. | |
| 2016/0149804 A1 | 5/2016 | Mirza | |
| 2016/0255542 A1 | 9/2016 | Hughes et al. | |
| 2016/0261641 A1 | 9/2016 | Mattes et al. | |
| 2017/0019430 A1 | 1/2017 | Cohn | |
| 2017/0142208 A1* | 5/2017 | Hammer | H04L 43/08 |
| 2017/0238215 A1 | 8/2017 | Jin | |
| 2017/0373936 A1 | 12/2017 | Hooda et al. | |
| 2018/0083968 A1 | 3/2018 | Xu et al. | |
| 2018/0084060 A1* | 3/2018 | Xie | H04L 63/02 |
| 2018/0124183 A1* | 5/2018 | Kozat | H04L 67/125 |
| 2018/0234459 A1 | 8/2018 | Kung et al. | |
| 2019/0132152 A1* | 5/2019 | Wang | H04L 45/64 |
| 2019/0149401 A1 | 5/2019 | Ramachandran et al. | |
| 2019/0394107 A1* | 12/2019 | Marrone | H04L 65/102 |
| 2020/0067341 A1 | 2/2020 | Glover et al. | |
| 2021/0084048 A1 | 3/2021 | Kannan et al. | |

FOREIGN PATENT DOCUMENTS

| | | |
|---|---|---|
| WO | 2011159842 A2 | 12/2011 |
| WO | 2019246331 A1 | 12/2019 |

OTHER PUBLICATIONS

Asguard Networks, Inc., "SimpleConnectTM Product Information," Retrieved on Nov. 9, 2012, from http://www.asguardnetworks.com/product, 1 page.

Asguard Networks, Inc., "Welcome to Asguard Networks," Retrieved on Oct. 23, 2012, from http://www.asguardnetworks.com/, 1 page.

Asguard Networks, Inc., "SimpleConnectTM Quick Start Documentation Guide," Revision 1, Dec. 13, 2012, pp. 1-18.

Henderson, T. et al., "HIP-based Virtual Private LAN Service (HIPLS)," Network Working Group, Internet-Draft, The Boeing Company, Nov. 6, 2012, pp. 1-16.

International Search Report and Written Opinion for International Patent Application No. PCT/US2014/023632 dated Jun. 23, 2014, pp. 1-13.

Asguard Networks, Inc., "Gray Matter Systems Announces Asguard Networks Partnership at 2012 Gray Matter Systems Training and User Group Meeting," Aug. 9, 2012, retrieved on Oct. 23, 2012, from http://www.asguardnetworks.com/news, pp. 1-2.

(56) References Cited

OTHER PUBLICATIONS

Trusted Computing Group, Incorporated, "TCG Trusted Network Connect: IF-MAP Metadata for ICS Security," Specification Version 1.0, Revision 44, May 8, 2014, pp. 1-64.
Office Communication for U.S. Appl. No. 14/740,053 dated Jul. 29, 2015, pp. 1-10.
Office Communication for U.S. Appl. No. 14/204,907 dated Jul. 10, 2015, pp. 1-20.
Aoyagi, S. et al., "ELA: A Fully Distributed VPN System Over Peer-to-Peer Network," Proceedings of the 2005 Symposium on Applications and the Internet, 2005, IEEE, Computer Society; pp. 1-4.
Benyamina, D. et al., "Wireless Mesh Networks Design—A Survey," IEEE Communications Survey & Tutorials, vol. 14, No. 2, Second Quarter 2012, pp. 299-310.
International Search Report and Written Opinion for International Patent Application No. PCT/US2015/042993 dated Nov. 11, 2015, pp. 1-11.
Office Communication for U.S. Appl. No. 14/204,907 dated Dec. 2, 2015, pp. 1-14.
Official Communication for U.S. Appl. No. 15/156,254 dated Aug. 3, 2016, pp. 1-13.
Trusted Computing Group (Architects Guide; ICS Security Using TNC Technology, Oct. 2013, pp. 1-6.
Official Communication for U.S. Appl. No. 15/083,214 dated Oct. 25, 2016, pp. 1-11.
Office Communication for U.S. Appl. No. 14/740,053 dated Jan. 21, 2016, pp. 1-18.
Office Communication for U.S. Appl. No. 14/204,907 dated Feb. 24, 2016, pp. 1-20.
Official Communication for U.S. Appl. No. 15/083,214 dated Jul. 7, 2016, pp. 1-11.
Official Communication for U.S. Appl. No. 15/201,063 dated Nov. 2, 2016, pp. 1-11.
Official Communication for U.S. Appl. No. 15/156,254 dated Dec. 30, 2016, pp. 1-13.
Official Communication for U.S. Appl. No. 15/083,214 dated Jan. 9, 2017, pp. 1-5.
Official Communication for U.S. Appl. No. 15/156,254 dated May 5, 2017, pp. 1-13.
Official Communication for U.S. Appl. No. 15/083,214 dated Feb. 9, 2017, pp. 1-10.
Official Communication for U.S. Appl. No. 14/814,283 dated Jun. 9, 2017, pp. 1-18.
Official Communication for U.S. Appl. No. 15/201,063 dated Apr. 21, 2017, pp. 1-14.
Official Communication for U.S. Appl. No. 14/814,283 dated Nov. 30, 2015, pp. 1-8.
Official Communication for U.S. Appl. No. 14/814,283 dated Jun. 3, 2016, pp. 1-10.
Official Communication for U.S. Appl. No. 14/814,283 dated Aug. 23, 2016, pp. 1-7.
Official Communication for U.S. Appl. No. 14/814,283 dated Nov. 21, 2016, pp. 1-10.
Official Communication for U.S. Appl. No. 15/156,254 dated Oct. 19, 2017, pp. 1-13.
Lawton, "Machine-to-Machine Technology gears up for growth", 2004, pp. 12-15, IEEE Computer Society, pp. 1-4.
Official Communication for U.S. Appl. No. 15/670,925 dated Apr. 5, 2018, pp. 1-10.
Official Communication for U.S. Appl. No. 15/156,254 dated May 14, 2018, pp. 1-17.
Official Communication for U.S. Appl. No. 15/670,859 dated Jun. 29, 2018, pp. 1-29.
Official Communication for U.S. Appl. No. 15/924,148 dated Jun. 5, 2018, pp. 1-24.
Official Communication for U.S. Appl. No. 15/987,762 dated Sep. 12, 2018, pp. 1-24.
Official Communication for U.S. Appl. No. 15/670,859 dated Nov. 26, 2018, pp. 1-20.
Official Communication for U.S. Appl. No. 15/994,760 dated Oct. 1, 2018, pp. 1-22.
Official Communication for U.S. Appl. No. 16/267,166 dated Jan. 14, 2020, pp. 1-5.
Official Communication for U.S. Appl. No. 16/172,621 dated Mar. 17, 2020, pp. 1-7.
Official Communication for U.S. Appl. No. 16/562,258 dated Apr. 7, 2020, pp. 1-10.
Official Communication for U.S. Appl. No. 16/172,621 dated Jul. 15, 2020, pp. 1-14.
Official Communication for U.S. Appl. No. 16/267,166 dated Jul. 22, 2020, pp. 1-8.
Office Communication for U.S. Appl. No. 16/562,258 dated Sep. 8, 2020, pp. 1-11.
Office Communication for U.S. Appl. No. 16/913,114 dated Oct. 1, 2020, pp. 1-21.
Office Communication for U.S. Appl. No. 16/562,258 dated Nov. 20, 2020, pp. 1-5.
Office Communication for U.S. Appl. No. 17/084,557 dated Dec. 16, 2020, pp. 1-23.
Office Communication for U.S. Appl. No. 17/079,248 dated Jan. 7, 2021, pp. 1-10.
Office Communication for U.S. Appl. No. 17/079,248 dated Feb. 17, 2021, pp. 1-7.
Office Communication for U.S. Appl. No. 16/562,258 dated Mar. 19, 2021, pp. 1-11.
Office Communication for U.S. Appl. No. 17/084,557 dated Apr. 1, 2021, pp. 1-11.

* cited by examiner

MONITORING OVERLAY NETWORKS

CROSS-REFERENCE TO RELATED APPLICATION(S)

This Utility Patent Application is a Continuation of U.S. patent application Ser. No. 15/994,760 filed on May 31, 2018, now U.S. Pat. No. 10,158,545 issued on Dec. 18, 2018, the benefit of which is claimed under 35 U.S.C. § 120, and the contents of which is further incorporated in entirety by reference.

TECHNICAL FIELD

The present invention relates generally to network management, and more particularly, but not exclusively, to monitoring network activity in networks that include overlay networks.

BACKGROUND

Modern computing systems or computing environments often include a diverse collection of client computers, server computers, relays, gateways, or the like, that may be interconnected using heterogeneous networks comprised of different physical or logical networks. In some cases, reliably passing network traffic through such heterogeneous networks may require advanced network administration operations, complex interoperability integration, or the like.

Furthermore, networks for some enterprises may include industrial equipment, such as manufacturing equipment used to build or assemble products, may be supported by industrial networks. In industrial networks, operations of machines that control industrial processes (e.g., manufacturing, machining, stamping, product packaging, or the like) may be arranged to communicate with other machines or computers over the industrial network. In some cases, such communication may be related to supervising and controlling operations of the various industrial machines. Also, industrial networks may be used to collect data from industrial machines for monitoring manufacturing or assembly processes, monitoring and improving operational efficiency and throughput, quality control, or the like.

Also, in some cases, the communication/networking protocols used in some networks, such as, industrial networks may differ from, or be incompatible with, standard communications protocols that may commonly be used for business networks. In some cases this makes establishing connectivity relationships between the two types of networks challenging. In addition, many industrial networks were not designed to support modern information security that may be required to interoperate compatible with business network security protocols, or to be compliant with regulatory standards. Further, in some cases, efforts to reduce the difficulty of managing network interoperability may interfere with conventional network monitoring tools, in some cases, rendering them ineffective. Thus, it is with respect to these and other considerations that these innovations are made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
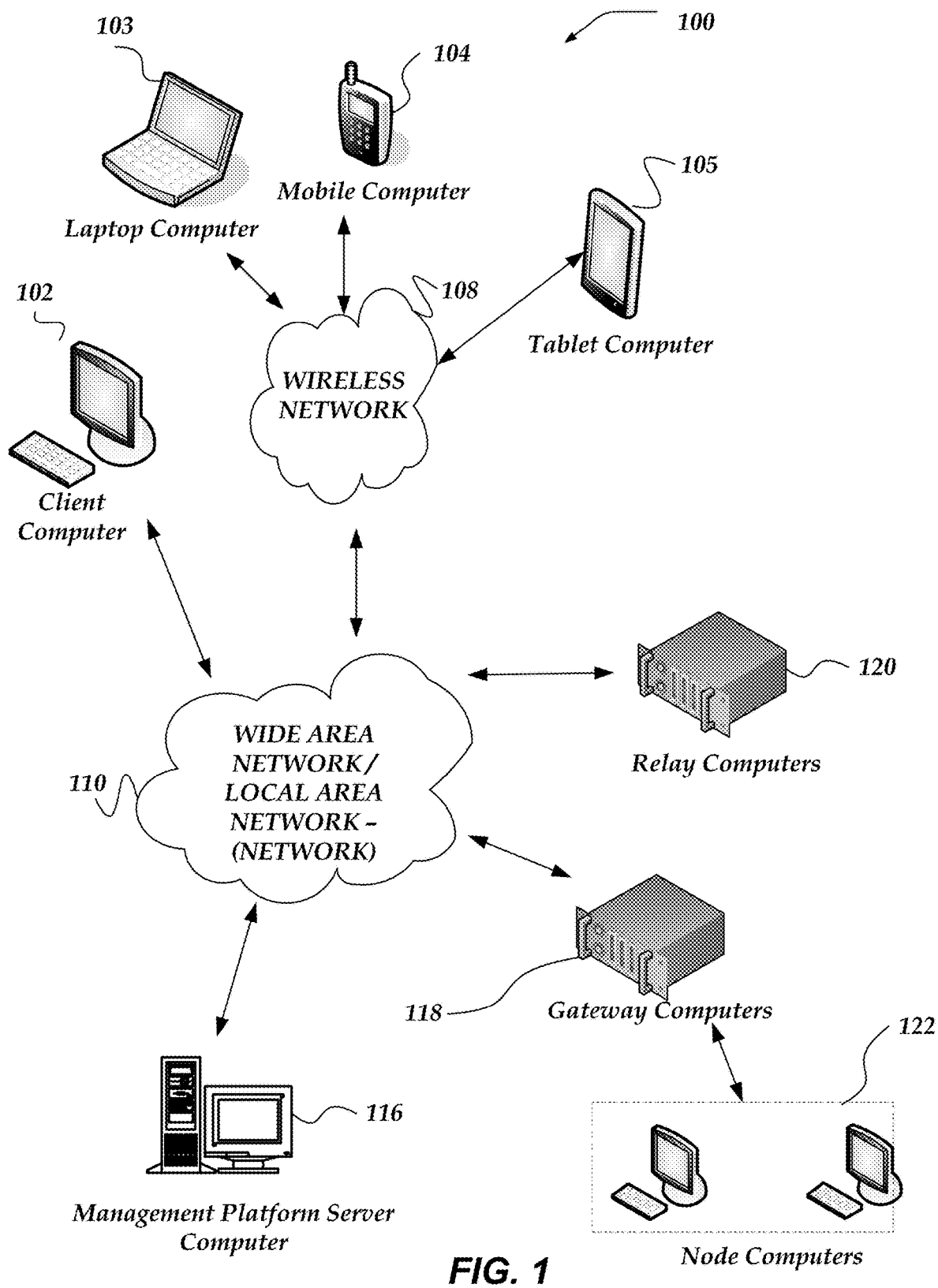
FIG. 1 shows components of one embodiment of an environment in which embodiments of the invention may be practiced.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. Phrases, such as, "in one embodiment," "in one or more embodiments, "some embodiments," "in one or more of the various embodiments," or the like, as used herein do not necessarily refer to the same embodiment, though it may. Furthermore, phrases, such as, "in one embodiment," "in one or more embodiments, "some embodiments," "in one or more of the various embodiments," or the like, as used herein do not necessarily refer to a different embodiment, although it may. Thus, as described below, various embodiments may be readily combined, without departing from the scope or spirit of the invention. Similarly, phrases, such as, "in one or more embodiments, "some embodiments," "in one or more of the various embodiments", or the like.

In addition, as used herein, the term "or" is an inclusive "or" operator, and is equivalent to the term "or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term "physical network" refers to the actual communication network that interconnects one or more computers or networks. The physical network may be a physical or native network device/components used to connect one or more computers or industrial devices (machines) in a network. Physical networks include network interfaces, wire, wireless hotspots, switches, routers, repeaters, or the like, that comprise the physical network. Also, physical networks may be considered to include the native communication protocols, network topology, and so on, that may be used to setup an overlay network in an various environments. In some cases, physical networks may be arranged to enable open communication between node computers, (e.g., machines, workstations, client computers, and so on), gateway computers, management platform computers, relay computers, or the like, that are on the physical network.

As used herein the term "overlay network" refers logical networks of industrial computer/machines, workstations, client computers, gateway computers, or the like, that are arranged or deployed on or over one or more underlying physical networks Devices, computers, services, or the like, arranged to use an overlay network are generally configured such that the underlying physical network is not observable or directly accessible. Rather, the overlay network provides an abstraction layer that hides the physical network from the members of the overlay network.

As used herein the terms "node," and "node computer" refer to computers that are endpoint computers that are interconnected using overlay networks. Node computers are physically (by wire or wirelessly) connected to physical networks but logically and practically they communicate via overlay networks that built on physical networks. Node computers may include client computers, smart phones, video cameras, sensors, network computers, industrial workstations, press machines, robots, packaging machines, automated milling machines, automated printing presses, pumps, valves, boilers, or the like. Node computers are considered to be computers or devices connected to physical networks or overlay networks exclusive of gateway computers, relay computers, management platform server computers, or the like. Nodes gain access to other nodes or computers via the overlay networks as managed by management platform servers and gateway computers As used herein the terms "source node," and "source node computer" refer to a node computer that is the originating endpoint of a network communication.

As used herein the terms "target node," and "target node computer" refer to a node computer that is the ultimate intended destination of a communication. In some embodiments, a source node computer may be communicating to one or more other node computers over an overlay network.

The intended recipients of these communications may be considered target node computers. Accordingly, a node computer may be a target node computer if it receives communications and it may be a source node computer if it sends communications.

As used herein the terms "gateway," or "gateway computer" refer to computers connected to a network that are disposed between the node computers and the greater physical network. Gateway computers may be network computers that may be arranged to provide security, access control, communication routing, or the like, for overlay networks. In some embodiments, gateway computers may be configured by another network computer, such as, a management platform computer.

As used herein the term "relay computer", or "relay" refer to one or more computers that serve as intermediaries for establishing connections between gateway computers that may be on different physical networks. In some cases, relay computers may be associated with network addresses that may be reached from more than one physical network.

As used herein the term "network address" refers to a value or values used for locating an endpoint in a network. In some embodiments, endpoints may include services, networks, network computers, client computers, applications, firewalls, routers, load balancers, node computers, gateway computers, relay computers, management platform computers, or the like. A network address may be assumed to comprise one or more components, such as, Internet Protocol (IP) address, other network address, a port number, VLAN identifier, tunnel identifier, routing interface identifier, physical interface identifier, a protocol identifier, or the like, or combination thereof. In some embodiments, port numbers may be TCP or UDP port numbers. For example, in some embodiments, a network address in a network may be assumed to include an IP address and a port. The particular constituent components or formats of network addresses may vary to meet one or more characteristics or requirements of the networks or communication protocols being used.

As used herein the terms, "gateway link," or "link" refer to physical, cellular, wireless, or logical network components that may be used to connect a gateway computer to one or more networks. Typically, different links may provide different ways or mechanism to reach the same networks. In some cases, one or more gateway links may enable access to one or more networks, sub-networks, locations, nodes, or the like, that may be unreachable via other gateway links. Gateway links may be associated with different network addresses or network interfaces. Different gateway links may support different communication protocols. Also, in some cases, gateway computers may be arranged to use two or more gateway links at the same time. In other cases, gateway computer may be arranged to use one gateway link at a time.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing communication over one or more networks. In one or more of the various embodiments, a network computer may be employed as a management platform computer that provides one or more monitoring rules and one or more event rules. In one or more of the various embodiments, a monitoring engine may be instantiated to perform actions including receiving network traffic from one or more links to a physical network such that the network traffic may be associated with one or more network addresses of the physical network one or more gateway identifiers (GIDs) that may be associated with one or more gateway computers in an overlay network such that visibility of activity associated with the network traffic is obscured by the overlay network. In one or more of the various embodiments, instantiating the monitoring engine may include, installing one or more monitors or event generators based on one or more of configuration information, the monitoring rules, or the event rules.

In one or more of the various embodiments, the monitoring engine may be arranged to analyze the network traffic to associate the activity with the one or more gateway identifiers (GIDs) such that the one or more GIDs may be separate from the one or more network addresses.

In one or more of the various embodiments, the monitoring engine may be arranged to monitor the network traffic based on the one or more monitoring rules.

In one or more of the various embodiments, the monitoring engine may be arranged to provide one or more metrics associated with the one or more gateway computers based on the monitoring of the network traffic and the one or more GID. In one or more of the various embodiments, providing one or more metrics associated with the one or more gateway computers may include, monitoring one or more responses to HTTP requests such that the monitoring may be directed to specific HTTP requests that may be associated with one or more of one or more source network addresses, one or more source GIDs, one or more target network addresses, one or more target GIDs, one or more applications, one or more text patterns that may be included in the one or more responses, one or more HTTP header values, or one or more query string parameters.

In one or more of the various embodiments, providing the one or more metrics associated with the one or more gateway computers based on the monitoring of the network traffic, may include: determining one or more node computers that connect to the one or more gateway computers; and generating an event that includes information about the node computer, including, one or more of one or more GIDs, one or more MAC addresses, one or more network addresses, hostnames, one or more cryptographic keys, or one or more security certificates.

In one or more of the various embodiments, providing the one or more metrics associated with the one or more gateway computers based on the monitoring of the network traffic, may include, monitoring one or more devices in the overlay network such that the devices include one or more of one or more individual network devices, one or more group of network devices, each network device that is associated with the one or more gateway computers, or each network device that may be associated with each gateway computer that are associated with a defined group of gateway computers.

In one or more of the various embodiments, the monitoring engine may be arranged to compare the one or more metrics to the one or more event rules.

In one or more of the various embodiments, the monitoring engine may be arranged to generate one or more events based on one or more affirmative results of the comparison.

In one or more of the various embodiments, an event engine may be instantiated to perform actions, including, mapping the one or more events to one or more actions based on one or more characteristics of the one or more events.

In one or more of the various embodiments, the event engine may be arranged to execute the one or more actions. In one or more of the various embodiments, executing the one or more actions may include: enabling or disabling network communications for a gateway computer, group of gateway computers, or portions of the overlay network; enabling or disabling access to the overlay network for one or more of one or more devices, the one or more node computers, or one or more groups of devices or node computers based on a media access control (MAC) address associated with one or more of the one or more devices, the one or more node computers, or one or more groups of devices or node computers; adding or removing one or more device groups from the overlay network; enabling or disabling trust between one or more device groups in the overlay network; adding or removing one or more node computers to a device group; creating or deleting portions of routes in the overlay network; editing a routing table that is associated with the physical network; terminating one or more client sessions; disabling one or more users from accessing the overlay network; sending one or more notifications associated with the one or more events to one or more users; or the like.

In one or more of the various embodiments, executing the one or more actions may include: executing an ordered sequence of sub-actions that may be based on a type of the one or more events; and activating one or more hooks that are associated with one or more scripting languages.

In one or more of the various embodiments, the event engine may be arranged to communicate the one or more events to the management platform computer.

In one or more of the various embodiments, the management platform computer may be employed to instantiate another monitoring engine that performs actions including, monitoring one or more other metrics that are associated with the one or more gateway computers.

In one or more of the various embodiments, the other monitoring engine may be arranged to generate one or more other events based on the one or more other metrics.

In one or more of the various embodiments, the other monitoring engine may be arranged to provide the one or more other events to another event engine that is associated with the management platform computer.

In one or more of the various embodiments, the other monitoring engine may be arranged to employ the other event engine to map the one or more other events to one or more other actions and execute the one or more other actions.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, management platform server computer 116, gateway computers 118, relay computers 120, node computers 122, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like.

For example, client computers 102-105 may be configured to operate as a web server, client application, media player, mobile telephone, game console, desktop computer, or the like. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), JavaScript Object Notation (JSON), or the like, to display and send a message. In one embodiment, a user of the client computer may employ the browser application to perform various activities over a network (online). However, another application may also be used to perform various online activities.

Node computers 122 represent one or more client computer, network computer, or network devices, or the like, that may be arranged to access networks via a gateway computer. Each node computer may be associated with a gateway computer that enable network access to other node computers, gateway computers, or the like. Node computers 122 may be arranged to communicate with their associate gateway computer. Accordingly, in some embodiments, their gateway computer may route the node computer communication according to policy provided by a management platform server, such as, management platform server computer 116.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include overlay networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, management platform server computer 116, gateway computers 118, relay computers 120, node computers 122, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

Although FIG. 1 illustrates management platform server computer 116, gateway computers 118, relay computers 120, node computers 122 each as a single computer, the innovations or embodiments are not so limited. For example, one or more functions of management platform server computer 116, gateway computers 118, relay computers 120, node computers 122 or the like, may be distributed across one or more distinct network computers. Moreover, management platform server computer 116, gateway computers 118, relay computers 120, node computers 122 are not limited to a particular configuration such as the one shown in FIG. 1. Thus, in one or more embodiments, management platform server computer 116, gateway computers 118, relay computers 120, node computers 122 may be implemented using a plurality of network computers. In other embodiments, management platform server computer 116, gateway computers 118, relay computers 120, node computers 122 may operate as a plurality of network computers within a cluster architecture, a peer-to-peer architecture, or the like. Also, in some embodiments, one or more processors on one or more network computers may be arranged to perform one or more actions of management platform server computer 116, gateway computers 118, relay computers 120, node computers 122, or the like. Further, in at least one of the various embodiments, management platform server computer 116, gateway computers 118, relay computers 120, node computers 122 may be implemented using one or more cloud instances in one or more cloud computing environments. Likewise, in at least one of the various embodiments, management platform server computer 116, gateway computers 118, relay computers 120, node computers 122 may be implemented using one or more container instances in one or more container computers environments.

Illustrative Client Computer

Figure 2:
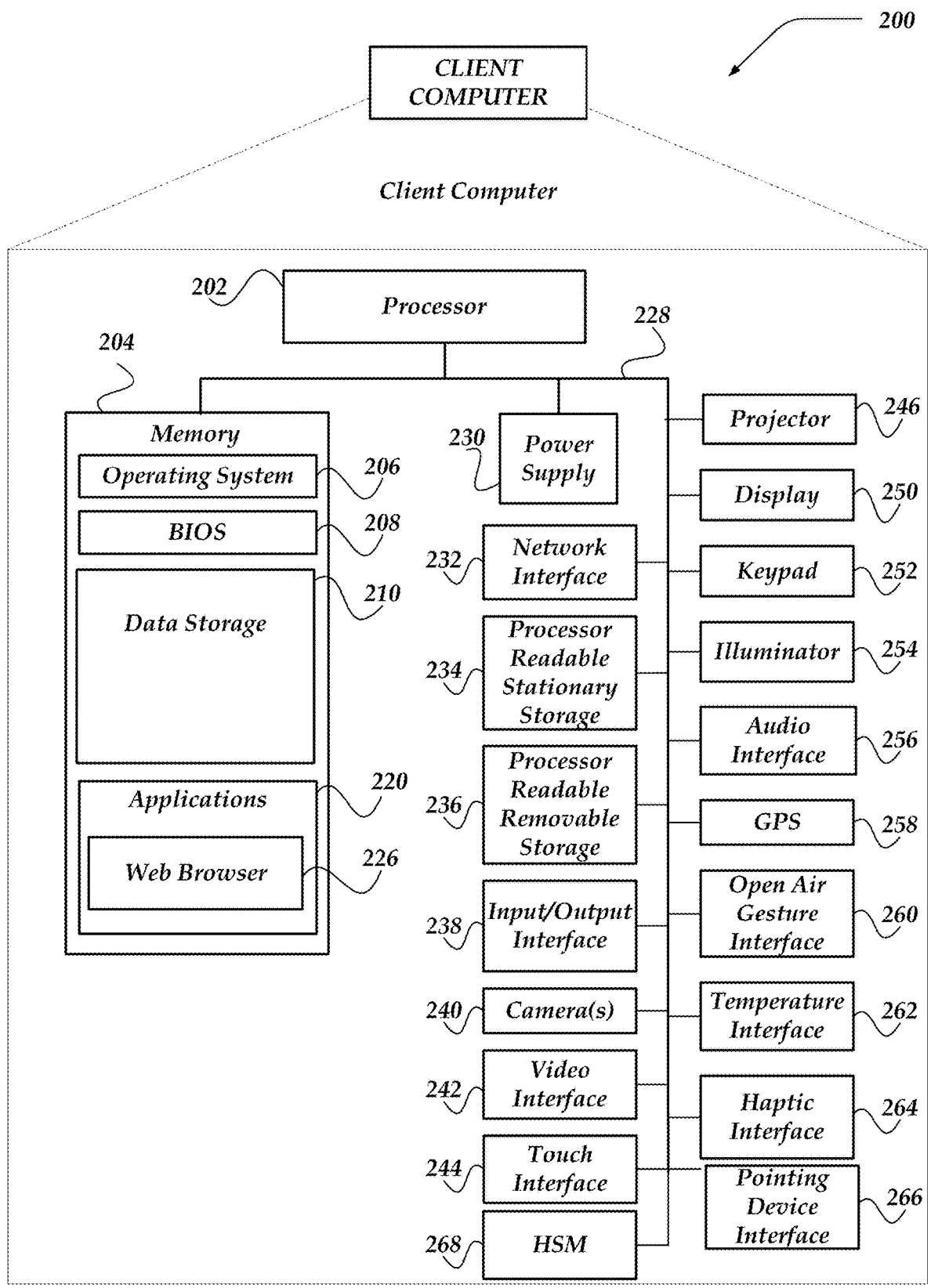
FIG. 2 shows one embodiment of a client computer that may be included in a system in accordance with at least one of the various embodiments.

FIG. 2 shows one embodiment of client computer 200 that may include many more or less components than those shown. Client computer 200 may represent, for example, at least one embodiment of mobile computers or client computers 102-105 shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to events. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In at least one embodiment, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that may be configured to receive and to send web pages, web-based messages, graphics, text, multimedia, and the like. The client computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like. Web browser 226 may be used to configure routes on management platform server computer 116, as discussed below in conjunction with FIG. 3. For example, a user may operate web browser application 226 in order to enable a first group of node computers to communicate with the second group of node computers through one or more gateway computers or relay computers.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX¹, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of events, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, web browser 226. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include a hardware microcontroller instead of a CPU. In at least one embodiment, the microcontroller may directly execute its own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
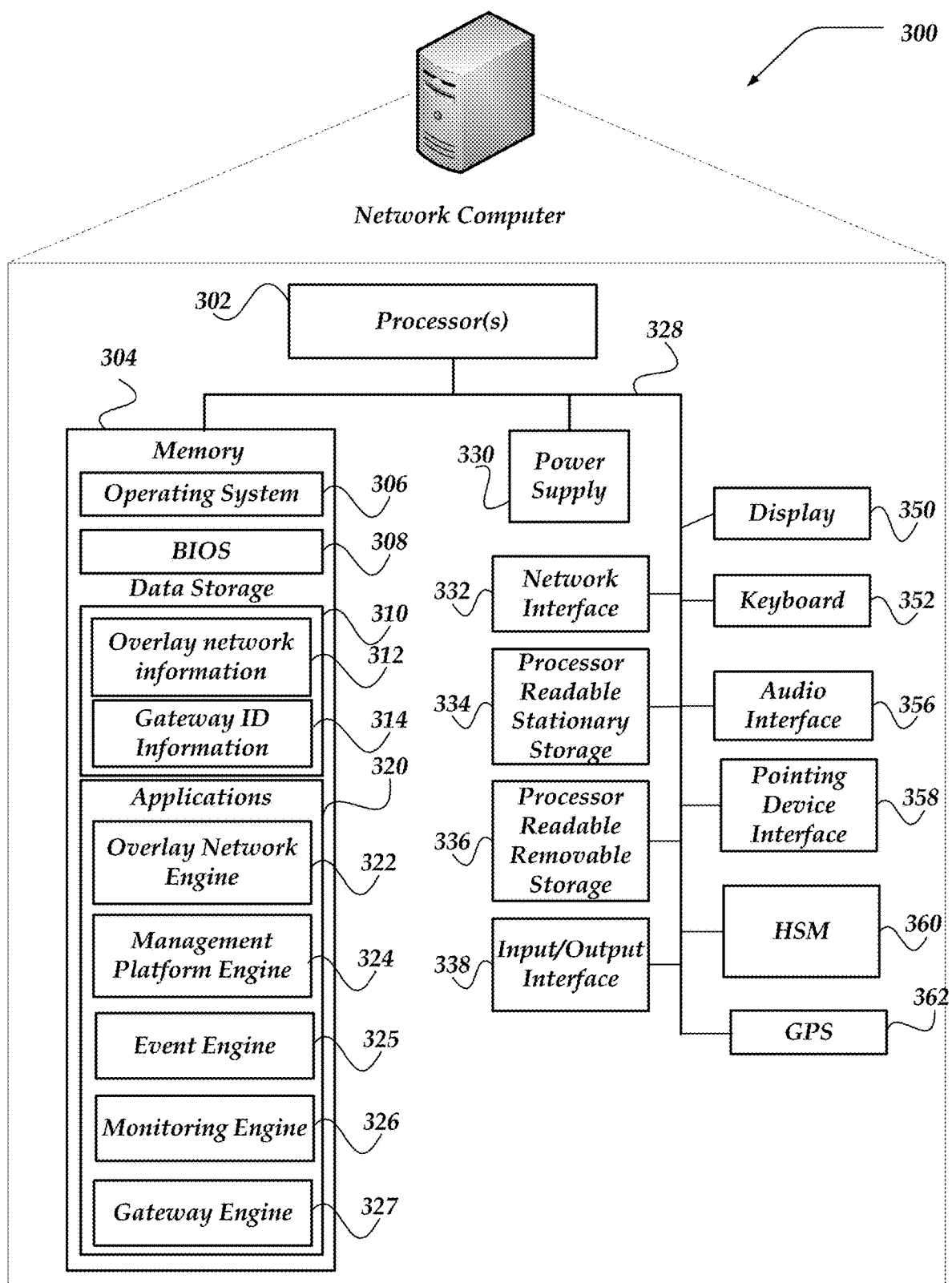
FIG. 3 shows one embodiment of a network computer, in accordance with at least one of the various embodiments.

FIG. 3 shows one embodiment of network computer 300 that may be included in a system implementing the invention. Network computer 300 may include many more or less components than those shown in FIG. 3. However, the components shown are sufficient to disclose an illustrative embodiment for practicing these innovations. Network computer 300 may represent, for example, one embodiment of one or more of management platform server computer 116, gateway computers 118, relay computers 120, or one or more node computers 122 of FIG. 1.

As shown in the figure, network computer 300 includes a processor 302 in communication with a memory 304 via a bus 328. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

In at least one of the various embodiments, processor 302 may include one or more separate hardware processors that are arranged to perform one or more specific task or actions. Also, in some embodiments, the one or more hardware processors comprising processor 302 may be the same processor. In some embodiments, the one or more hardware processors comprising processor 302 may be the included in the same network computer. In some embodiments, one or more of the one or more hardware processors comprising processor 302 may be included in different network computers.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. Display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

GPS transceiver 362 can determine the physical coordinates of network computer 300 on the surface of the Earth, which typically outputs a location as latitude and longitude values. GPS transceiver 362 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 362 can determine a physical location for network computer 300. In at least one embodiment, however, network computer 300 may, through other components, provide other information that may be employed to determine a physical location of the client computer, including for example, a Media Access Control (MAC) address, IP address, and the like.

Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of events, including being sent as part of a header during a communication, sent upon request, or the like. Data storage 310 may also be employed to store social networking information including address books, buddy lists, aliases, user profile information, or the like. Data storage 310 may further include program code, instructions, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300.

Data storage 310 may include, for example, overlay network information 312, gateway ID information 314, or the like. Overlay network information 312 may contain policy data defining which gateways, relays, or node computers are allowed to communicate with each other as well as the physical network routes that may be available. In one embodiment, overlay network information 312 may be generated and stored on management platform servers, such as, management platform server computer 116 before being distributed to gateway computers 118 and relay computers 120.

Data storage 310 may also include gateway identifier information 314 that may include information for identifying the gateway computer endpoints of for connection routes. A network address (e.g., IP address and port) for a given gateway computer may be discovered by an relay computer when the gateway computer initiates a connection to the relay computer. In scenarios when a gateway computer is located in a private network a public facing network address for that gateway computer may not be knowable unless the gateway computer initiates a connection outside of the private network.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include overlay network engine 322, management platform engine 324, event engine 325, monitoring engine 326, or gateway engine 327 which may be enabled to perform actions further described below. In at least one of the various embodiments, one or more of the applications or portions of applications may be implemented as modules or components of another application. Further, in one or more of the various embodiments, applications or portions of applications may be implemented as operating system extensions, modules, plugins, or the like.

In at least one of the various embodiments, applications, such as, operating system 306, overlay network engine 322, management platform engine 324, event engine 325, monitoring engine 326, gateway engine 327, or the like, may be arranged to employ geo-location information to select one or more localization features, such as, time zones, languages, currencies, calendar formatting, or the like. Localization features may be used when interpreting network traffic, interpreting node computer activity, monitoring or logging application activity, user-interfaces, reports, as well as internal processes or databases. In at least one of the various embodiments, geo-location information used for selecting localization information may be provided by GPS 362. Also, in some embodiments, geolocation information may include information provided using one or more geolocation protocols over the networks, such as, wireless network 108 or network 110.

Furthermore, in at least one of the various embodiments, overlay network engine 322, management platform engine 324, event engine 325, monitoring engine 326, gateway engine 327, or the like, may be operative in a cloud-based computing environment. In at least one of the various embodiments, these applications, and others, that comprise the management platform may be executing within virtual machines or virtual servers that may be managed in a cloud-based based computing environment. In at least one of the various embodiments, in this context the applications may flow from one physical network computer within the cloud-based environment to another depending on performance and scaling considerations automatically managed by the cloud computing environment. Likewise, in at least one of the various embodiments, virtual machines or virtual servers dedicated to overlay network engine 322, management platform engine 324, event engine 325, monitoring engine 326, gateway engine 327, or the like, may be provisioned and de-commissioned automatically. Also, in at least one of the various embodiments, overlay network information 312, gateway identifier information 314, or the like, may located in virtual servers running in a cloud-based computing environment rather than being tied to one or more specific physical network computers. In some embodiments, various applications, data storage, or the like, may be operative in one or more container computers executing in a container computing environment.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include a hardware microcontroller instead of a CPU. In at least one embodiment, the microcontroller may directly execute its own embedded logic to perform actions and access its own internal memory and its own external Input and Output Interfaces (e.g., hardware pins or wireless transceivers) to perform actions, such as System On a Chip (SOC), or the like.

Illustrative Logical System Architecture

Figure 4:
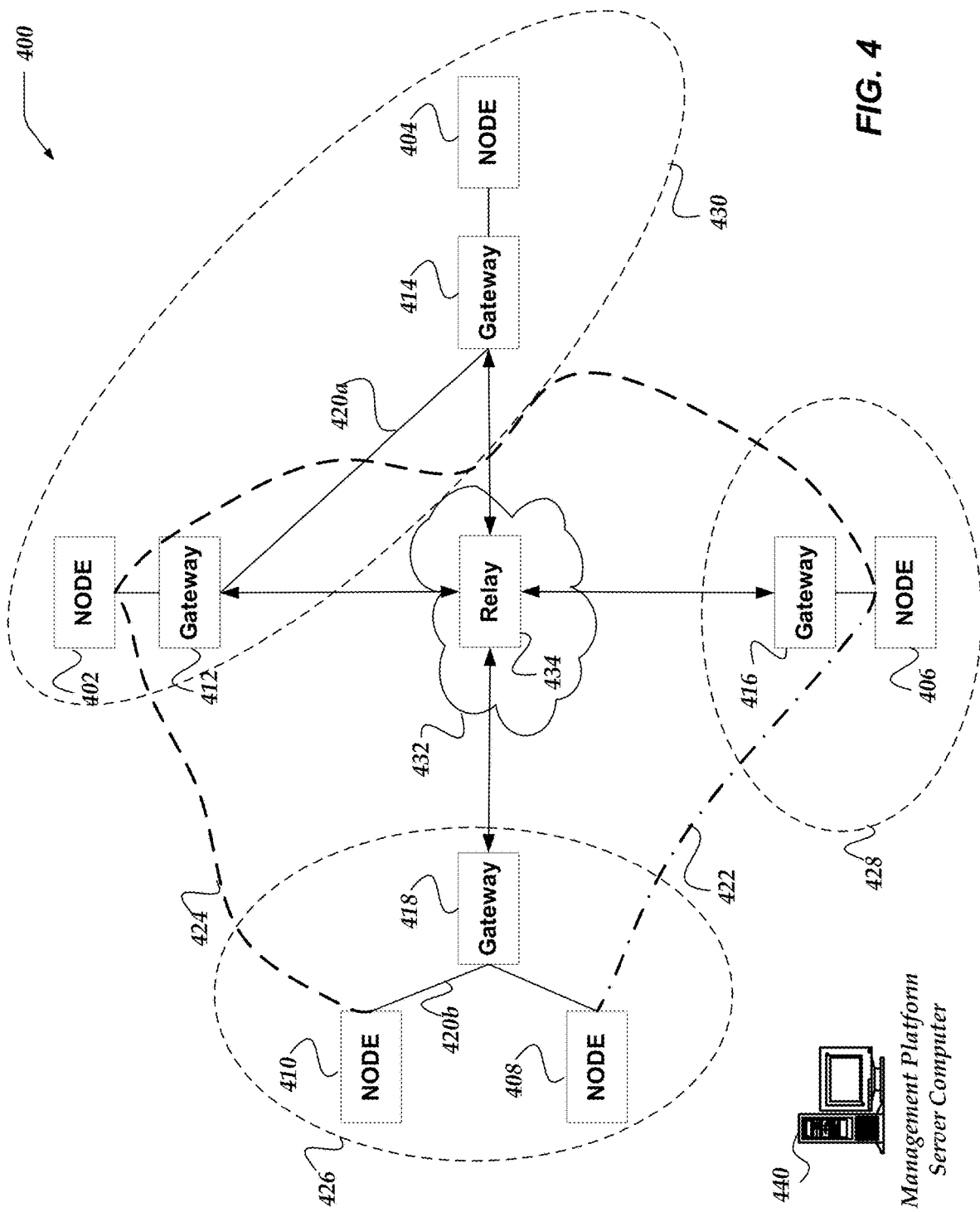
FIG. 4 illustrates a logical schematic of a network that includes overlay networks, in accordance with at least one of the various embodiments.

FIG. 4 illustrates a logical schematic of network 400 that includes overlay networks, in accordance with at least one of the various embodiments. Network 400 is arranged to include gateway computers, such as, gateway computers 412-418. Gateway computers may be disposed between one or more node computers and the underlying physical network infrastructure. In at least one of the various embodiments, the gateway computers may be arranged such that they isolate node computers, such as, node computers 402-410 from the physical network used to interconnect them. Also, in this example, management platform server computer 440 represents one or more management platform servers that may be assumed to be arranged to communicate over one or more networks with relay computers and gateway computers that comprise network 400. In one or more of the various embodiments, among other things, management platform server 440 may be arranged to manage the configuration or distribution of policy information.

In this example, physical networks, such as, physical network 420a, physical network 420b, a public network 432 provide an underlying physical network comprising network 400. In this example, node computer 404 is isolated from physical network 420a by gateway 414.

Also, in one or more of the various embodiments, private networks, such as, private network 426, private network 428, or private network 430 may represent separate or isolated networks that may be configured to prevent computers them from being visible or directly accessible from outside each of the private networks.

In some embodiments, gateway computers may be arranged to communicate with one or more relay computers, such as, relay computer 434 via another network, such as, network 432. In some embodiments, relay computer 434 may be arranged to have a network address that may be visible from computers that may be part of other networks, including private networks, such as, private network 420a and private network 420b, or the like.

Accordingly, in at least one of the various embodiments, the gateway computers may be configured to provide or enforce one or more overlay networks in network 400. In this example, for some embodiments, overlay network 422 enables node computer 406 and node computer 408 to "see" each other on the network; communication from node computer 406 to node computer 408 may be routed through gateway computer 416 to network 432 to relay 434 to gateway computer 418; and the communication may then be routed from gateway computer 418 to node 408 over private network 420b. From the point-of-view of node computer 406 and node computer 408 the communication appears to go directly over overlay network 422. In actuality the communication will be routed from node 406 to gateway computer 416 to relay 432 to gateway computer 418.

Likewise, in this example, network 400 may be arranged such that node computer 402, node computer 406, and node computer 410 communicate over overlay network 424. As described above, in at least one of the various embodiments, the communication among/between the nodes on overlay network 424 may be routed through relay 434 and two or more of the gateway computers.

In at least one of the various embodiments, the gateway computers may be configured with one or more rule-based policies that determine access or restrictions for network communication on the networks. The particular rules or restrictions associated with how communication information (e.g., network packets) should be routed through the overlay network may be established by a management platform computer, such as management platform server computer 440, or the like. Configuration information may be pushed (e.g., router tables, or the like) to each gateway computer to define the overlay networks, if any, as well other restrictions that may be applicable for one or more networks.

In at least one of the various embodiments, gateway computers may be arranged to include an explicit list of computer addresses/identities that are allowed to communicate with the gateway computer. Accordingly, if a node computer, such as, node computer 410 is in gateway computer 418's list of allowed computers (e.g., a whitelist) it may be enabled to initiate communication over the overlay network through gateway computer 418. Conversely, node computers, or any other computer for that matter, not in a gateway computer's whitelist may be denied access to that gateway computer and the overlay networks. Though, in some embodiments, a node computer may be allowed to access one or more particular gateway computers and denied accessed to others. In at least one of the various embodiments, a management platform computer, such as, management platform server computer 440, may be arranged to manage and distribute the whitelists to the one or more gateway computers.

In at least one of the various embodiments, by placing gateway computers between physical networks (e.g., private network 420a or private network 420b) and the node computers, the configuration or definition of one or more overlay networks may be accomplished without requiring the individual node computers to be reconfigured. Further, in at least one of the various embodiments, gateway computers may comprise security hardened computers that provide various routing, security or cryptography features to help secure the one or more networks. Otherwise, in at least one of the various embodiments, the network may be reliant on the security features of the node computers themselves which may be non-existent or very limited.

In some embodiments, gateway computers may include more than one gateway links each providing access to one or more networks. In one or more of the various embodiments, gateway links may be arranged to provide secure or redundant access to one or more networks. In some embodiments, one or more gateway links may be have access to one or more networks not available or accessible to some or all of the other gateway links.

In at least one of the various embodiments, overlay networks may be enforced by using one or more overlay whitelists that define the endpoints (e.g., node computer, gateway computers, relays computers, or the like) that may be accessed from other members of the overlay network. Accordingly, in at least one of the various embodiments, the computers on a given overlay network may be included on the overlay network whitelist. Likewise, in at least one of the various embodiments, computers absent from the overlay network may be omitted or excluded from the overlay network whitelist. Further, in at least one of the various embodiments, a computer may be included on more than one overlay network whitelist enabling it to be part of multiple overlay networks. In at least one of the various embodiments, management platform computer 440 may be arranged to manage and distribute the overlay whitelists to each gateway computer comprising an overlay network.

In some embodiments, computers in different networks may be unable to identify or access each other because this their local networks are using separate (perhaps conflicting) network address namespaces. For example, gateway computer 418, and consequently, node computers 408 and 410, cannot be accessed from outside of the private network 420*b* without gateway computer 418 first initiating a connection outside of private network 420*b*. This may be true even if a public network address associated with private network 420*b* is known because the network address of node computers in private networks, such as, private network 420*b* are not generally available to computers outside of the same private networks.

In some embodiments, relay computers, such as relay computer 434, may be associated with network addresses that are accessible from computers in one or more private or one or more public networks, in some cases, this may include the public Internet. In one embodiment, a node computer may request that a gateway computer initiate a connection to another node computer via another gateway computer that are located in another network. However, if neither gateway computer can see the other, because they are both located in separate private networks, one or more relay computers, such as, relay computer 434 may be employed to bridge the networks to enable node computers in one network to reach node computers in another network.

In one or more of the various embodiments, while gateway computers may be stationary on a network, in that they maintain the same network address indefinitely, the network address for a gateway computer may from time to time. For example, a gateway computer may be moved to a different location, e.g. to another building on a corporate campus that is associated with a different range of network addresses. Similarly, a gateway that is a mobile device such as a smart phone may pass between cell towers or access points, each of which may be associated with a different network addresses. In one or more of the various embodiments, gateway computers may also experience a change in network address if the network changes, e.g. if a new internet service provider (ISP) is introduced. However it happens, if a network address associated with a gateway computer changes, any existing connections using that network address will be dropped. However, because identity based networking does not rely on a host's location as identity, the connection can be seamlessly re-established if management platform server 440 discovers the change and broadcasts the new network address for the gateway computer. For example, if gateway computer 416 determines that its network address has changed, it will notify its associated management platform server of the change. In one or more of the various embodiments, the management platform server may then broadcast updated policies that include rules for the new network address. Accordingly, in one or more of the various embodiments, an existing connection between gateway computer 416 and gateway computer 412 through relay 434 may continue once relay 434 receives an updated policy from management platform server 440.

It is also possible for a device, such as one of nodes 402, 404, 406, 408, or 410, to be moved to a different gateway computer. In this scenario, management platform server 440 has to be notified of the new configuration before the node is to work again properly. For example, if node 410 were moved from private network 420*b* to private network 420*a*, management platform server 440 could be informed, either manually or automatically, and then update relevant relays with new policies. Existing connections may time-out or reset automatically, when it is discovered that endpoint no longer exists at the network address the connection is directed towards. Once a connection has timed-out or reset, a new connection may be initiated and the connection between endpoints may continue uninterrupted.

In one or more of the various embodiments, the use of gateway computers, relay computers, management platform computers, or the like, that establish an overlay network may interfere with conventional network monitoring devices or services. For example, the traffic between gateway computers, relay computers, management platform computers, or the like, is often encrypted to hide the source information, target information, content, or the like, from observation or monitoring using conventional tools. Further, in one or more of the various embodiments, because the management platform, gateway computers, relay computers, or the like, provide a logical or software defined network on top of a physical network, conventional monitoring tools may lack the context to provide useful monitoring information. Also, in one or more of the various embodiments, overlay networks, such as overlay network 400 may be arranged to hide or protect node computer network traffic which may also interfere with conventional monitoring tools.

Accordingly, in one or more of the various embodiments, gateway computers, relay computers, management platform computers, or the like, may be arranged to instantiate one or more monitoring engines that enable one or more monitoring functions. In one or more of the various embodiments, one or more monitoring engines may be arranged to have visibility of the network traffic with respect to the overlay network. In some embodiments, monitoring engines may be arranged to monitor network traffic in one or more networks and correlate one or more performance metrics or activities with the overlay network or devices or services on the overlay network.

In one or more of the various embodiments, monitoring engines may be arranged to determine the occurrence of one or more events that may be associated with the monitored metrics or activity in the overlay networks. In one or more of the various embodiments, the determination of whether an event has occurred may be based on one or more rules that may include one or more conditions, one or more thresholds, or the like, or combination thereof.

In one or more of the various embodiments, as events are detected by a monitoring engine, they may be provided to one or more event engines that may be instantiated to interpret the events and map them to one or more actions. In one or more of the various embodiments, event engines may be arranged to employ one or rules that determine which actions are associated with a given event.

In one or more of the various embodiments, event engines may be arranged to use rules that are built-in, or provided via configuration information, user-input, databases, or the like. In some embodiments, particular events or actions may be customized for a given network or user. Accordingly, in one or more of the various embodiments, while several use-cases are described herein, one or more ordinary skill in the art will appreciate that they are non-limiting examples and that one or more embodiments may be arranged to support many other use cases without departing from the scope of the innovations disclosed herein.

Figure 5:
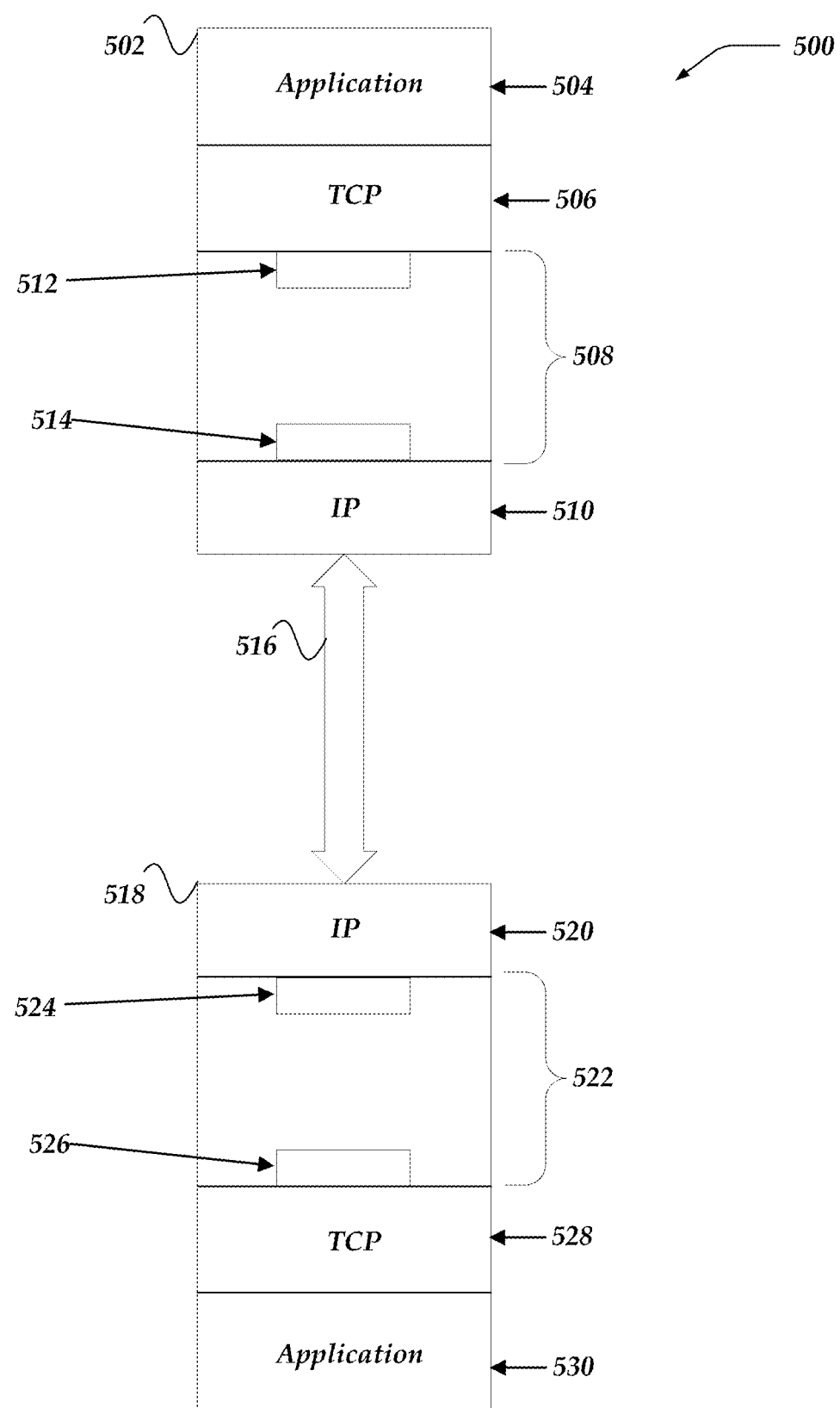
FIG. 5 illustrates a logical representation of a system for communicating in a network in accordance with at least one of the various embodiments.

FIG. 5 illustrates a logical representation of system 500 for communicating in a network in accordance with at least one of the various embodiments. In at least one of the various embodiments, communications that are processed on a gateway computer may comprise various logical layers that may comprise a functional network communication stack. In at least one of the various embodiments, a communication on one gateway computer, such as, communication 502 may be arranged such that an application layer, such as, application layer 504 may perform actions that include communication; next at layer 506, one or more standard network protocols APIs (TCP in this example) may be employed; at layer 508 one or more special actions may be performed to support the overlay networks. And, before the communication is sent out, the lower level layers, such as, layer 510 (IP layer in this example) may be applied.

In at least one of the various embodiments, gateway computers may be arranged to substitute their GID for use as a network address by higher layers such as application layer 504 and TCP layer 506. The GID may be arranged to be compatible with the native data structures that may be used to represent actual network addresses. Accordingly, in at least one of the various embodiments, application level networking API's that accept network address data structures as parameters may be enabled to accept GID instead. For example, in some embodiments, an internet address may be represented using a 32-bit value. Thus, in such embodiments, the GID may be a 32-bit number, making it size compatible with an ordinary network address value.

In at least one of the various embodiments, at the gateway layer, layer 508 in FIG. 5, the GID of the source gateway or the target gateway are mapped to an actual network address. In at least one of the various embodiments, component 512 may represent components that are arranged to map GIDs to network addresses, and component 514 may represent components that are arranged to map from a network address to a GID.

In at least one of the various embodiments, since the GIDs may be mapped to an actual network address, a network layer, such as IP layer 510 may generate the appropriate network protocol information for the communication. Accordingly, in at least one of the various embodiments, network path 516 may be employed to communicate the communication network packets to its next destination.

In at least one of the various embodiments, communication 518 represents the received version of communication 502. The network protocol layer (IP layer 520) accepts the communication over the network; gateway layer 522 employs component 524 and component 526 to map network addresses to GIDs; TCP layer 528 performs higher level network protocol actions using the GID in place of the network address; and application layer 530 employs the payload of the communication to perform application specific actions based on the actual contents of the payload.

Figure 6:
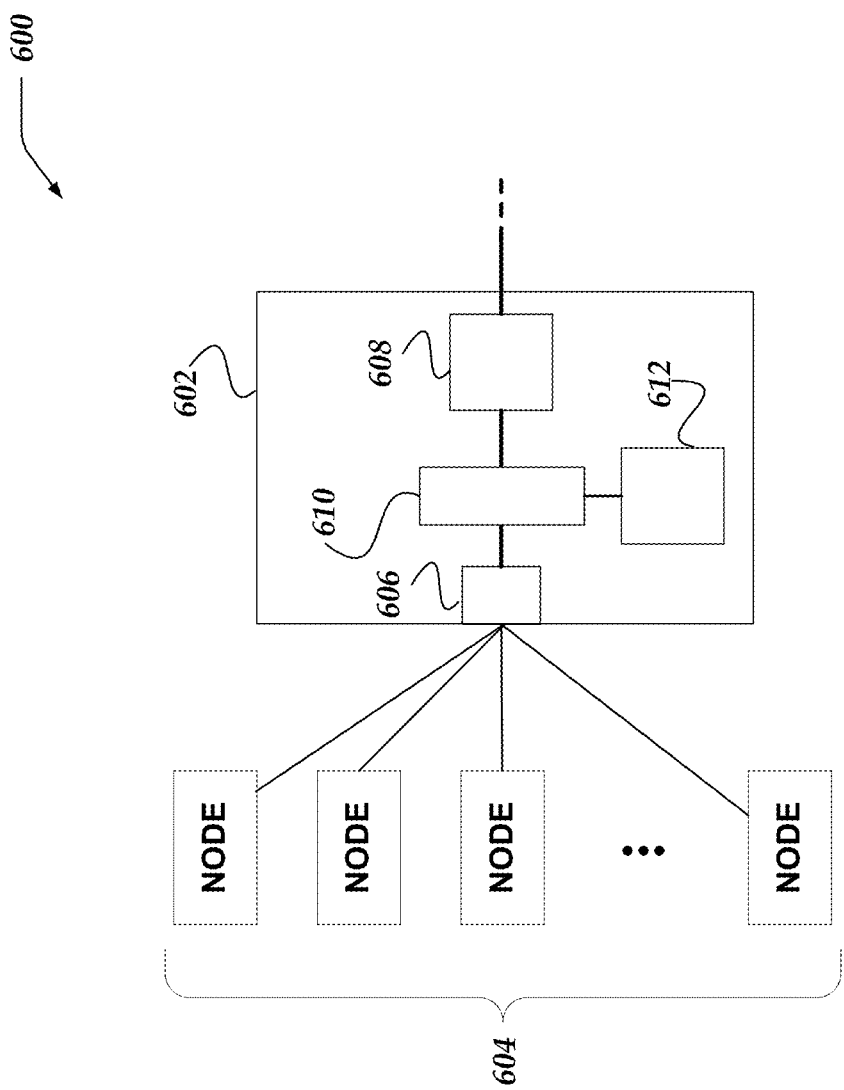
FIG. 6 illustrates a logical representation of a system for monitoring overlay networks at a gateway computer that is in accordance with one or more of the various embodiments.

FIG. 6 illustrates a logical representation of system 600 for monitoring overlay networks at a gateway computer that is in accordance with one or more of the various embodiments. In this example, gateway computer 602 may be arranged to provide gateway services for one or more nodes, such as, nodes 604.

In one or more of the various embodiments, gateway computers may be arranged to include two or more interfaces that make its gateway links, such as, interface 608, or the like, for communication over one or more communication links. Also, in some embodiments, node computers 604 may be arranged to communicate with gateway computer 602 over one or more interfaces, such as, interface 606.

In one or more of the various embodiments, gateway computers may be arranged to instantiate one or more monitoring engines, such as, monitoring engine 610, that perform one or more monitoring actions to collect, measure, or evaluate one or more performance metrics or network activity that may be associated with a gateway computer or its associated nodes. In some embodiments, the monitoring actions may include active or passive operations that may collect one or more performance metrics that may be used to evaluate various overlay network metrics, including, the gateway links, node traffic, node activity, relay computer activity, or the like. In some embodiments, monitoring engines may be arranged to select the how to evaluate a given metric or activity based on policy rules, configuration information, user input, or the like, or combination thereof.

In one or more of the various embodiments, one or more monitoring rules may be associated with particular node computers, gateway computers, relay computers, management computers, or the like. In some embodiments, one or more of the monitoring rules may be associated with applications, content-type, content-size, content priority, content importance, source/target address combinations, communication protocols, day or date, time-of-day, or the like, or combination thereof. Accordingly, in one or more of the various embodiments, monitoring rules may be customized for networking environments or user considerations.

In one or more of the various embodiments, monitoring may include passively collecting metrics while a gateway link is in use or the gateway computer is otherwise servicing active communication sessions. Accordingly, while give node computer is using a gateway link to communicate via the gateway computer, a monitoring engine may be arranged to collect one or more of the various metrics. Likewise, in one or more of the various embodiments, monitoring engines may be arranged to monitoring one or more metrics or activities that may be associated with communication direction to the gateway computer or one or more node computers.

Also, in one or more of the various embodiments, one or more monitoring engines may be arranged to perform active monitoring actions that include, pings, upload/download speed tests, trace routes, or the like.

In one or more of the various embodiments, the monitoring engine may be arranged to apply one or more monitoring rules to determine if a monitoring event has occurred. In some embodiments, the one or more monitoring rules may include one or more conditions, tests, threshold values, or the like, that may be used to determine if one or more monitoring events should be generated. In some embodiments, if one or more monitoring events are generated, the monitoring engine may provide them to an event engine, such as event engine 612, for interpretation.

In one or more of the various embodiments, event engines may be arranged to map monitoring events to one or more actions. In one or more of the various embodiments, actions may include various reporting operations, such as, logging information, generating notifications or alarms, displaying event information on a user-interface, or the like, or combination thereof. Further, in one or more of the various embodiments, actions may include various remediation or mitigation operations, such as, blocking traffic, isolating devices or applications, re-routing traffic, or the like, or combination thereof. In some embodiments, event engines may be arranged to determine how monitoring events map to actions based on policy rules, configuration information, user input, or the like, or combination thereof.

Figure 7:
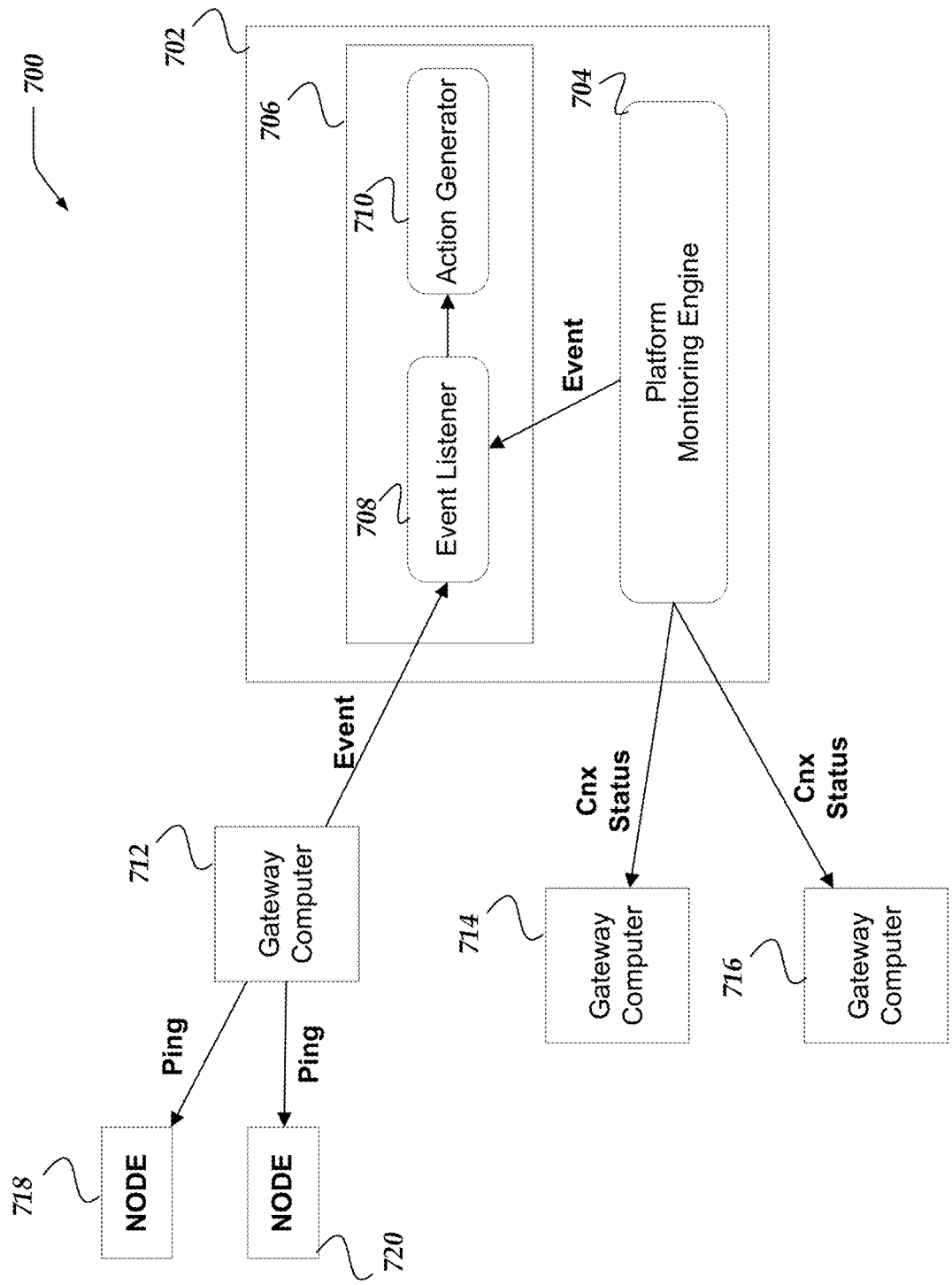
FIG. 7 illustrates a logical representation of a system for monitoring overlay networks at a management platform computer that is in accordance with one or more of the various embodiments.

FIG. 7 illustrates a logical representation of system 700 for monitoring overlay networks at a management platform computer that is in accordance with one or more of the various embodiments. Above, FIG. 6 described activity in an overlay network may be monitored at gateway computers, here, system 700 illustrates how activity in the overlay network may be monitored at a management platform computer in accordance with one or more of the various embodiments.

In one or more of the various embodiments, management platform computer 702 may include one or more monitoring engines, such as, monitoring engine 704 and one or more event engines, such as, event engine 706. In some embodiments, event engines, such as, event engine 706 may be arranged to include one or more event listeners, such as, event listener 708 and one or more action generators, such as, action generator 710. In some embodiments, management platform computer 702 may be arranged to monitor activity associated with one or more gateway computers, such as, gateway computer 712, gateway computer 714, gateway computer 716, or the like. Likewise, each gateway computer may be arranged to manage one or more node computers, such as, node computer 718, node computer 720, or the like. Note, for brevity and clarity, node computers managed by gateway computer 714 and gateway computer 716 are not illustrated here.

In one or more of the various embodiments, system 700 illustrates how events from one or more gateway computers, such as, gateway computer 712 may be forwarded to one or more event engines for interpretation. Likewise, in some embodiments, one or more monitoring engines that are instantiated on management platform computers may be arranged to generate events and provide them to event engine 706 as well.

For example, in some embodiments, gateway computer 712 may be arranged to instantiate a monitoring engine that may actively evaluate availability or accessibility by executing ping operations. Here in this example, the monitoring engine on gateway computer 712 is pinging node computer 718 and node computer 720. Accordingly, in one or more of the various embodiments, the information gathered by performing the ping operations may be used to evaluate some aspect of the connections between gateway computer 712 and one or more of its node computers.

In this example, if the information provided by pinging node computer 718 or node computer 720 triggers the generation of one or more monitoring events, gateway computer 712 may provide the one or more events to event engine 706 that may be instantiated on management platform computer 702. Accordingly, in one or more of the various embodiments, event engine 706 may be arranged to interpret the event using event listener 708 and determine the actions, if any, that should be performed. In some embodiments, one or more components, such as, action generator 710 may be arranged to execute the one or more actions that may be associated with one or more events.

Also, in this example, monitoring engine 704 running on management platform computer 702 may be arranged to monitor one or more metrics or activities, including the connection status of one of or more of its gateway computers. In this example, monitoring engine 704 may be arranged to continuously monitor the connection status between management platform computer 702 and gateway computer 714 and gateway computer 716. In this example, if metrics or activity associated with monitoring being performed by monitoring engine 704, monitoring engine 704 may generate one or more monitoring events and provide them to event engine 706 for interpretation.

In one or more of the various embodiments, monitoring engines may be arranged to support a plug-in or pipeline architecture the enables various monitors or event generators to be installed. In one or more of the various embodiments, the particular monitors or event generators installed or configured for use with a given monitoring engine may be determined based on configuration information, including the monitor rules or monitoring policies.

Accordingly, in one or more of the various embodiments, the number or type of monitors may be considered arbitrary. In some embodiments, any number of monitors may be constructed, installed, or configured to meet the needs of an organization or user. Below, several examples or use cases are described. One of ordinary skill in the art will appreciate that other or additional use cases, not described here, are anticipated and within the scope of the disclosed innovations. However, the uses cases illustrated below are at least sufficient for enabling one of ordinary skill in the art to practice these innovations.

In one or more of the various embodiments, one or more monitors may be installed that watch for responses to HTTP requests. In some embodiments, such monitors may be arranged to generically observe source or target network address, request URLs, HTTP header values, query strings, or the like. In other embodiments, monitors may be tailored to specific HTTP requests that may be associated with particular source or targets, applications, or the like. In some embodiments, HTTP monitors may include filters or pattern matchers that are arranged to look for particular patterns or content in requests or responses to requests.

In one or more of the various embodiments, monitors may be installed that detect if new node computers are associated with a gateway computer. For example, if a node computer attempts to register with a gateway computer, the monitoring engine on the gateway computer may be arranged to generate an event that includes information about the node computer, including, GID, MAC address, network address, hostname, cryptographic keys or certificates, or the like. Accordingly, if the event is provided to an event engine on an management platform computer, the event engine may trigger one or more actions to verify or authenticate the new node computer.

For example, if a node computer joins a network and attempts to register with a gateway computer, the monitoring engine on the gateway computer may generate an event and provide it to its management platform computer. Accordingly, in one or more of the various embodiments, the event may be configured to be synchronous where the gateway computer waits for the management platform computer to validate or confirm the node computer. Or, in some embodiments, the event may be asynchronous, such that if the management platform computer disqualifies the node computer it will send a subsequent command or updated policies to the gateway computer to block the disqualified node computer from accessing devices in the overlay network.

In one or more of the various embodiments, a monitor may be provided that pings one or more devices or node computers. If the ping round trip time (RTT) exceeds a user defined threshold, an event may be generated on the gateway computer and sent to its management platform computer. When the management platform computer receives the event, any associated monitoring actions may be executed. In some embodiments, an alert action may be performed. The alert may be visible to the customer via a graphical user-interface and may display more detailed information about the event or its underlying cause. Accordingly, in some embodiments, a user may acknowledge the alert. The user that acknowledged the alert and the time it was acknowledged maybe recorded in a database.

Other common monitors may include: traceroutes; HTTP ping (e.g., 200 OK response are okay); DNS queries to confirm name service record content or availability; device MAC address changed; node computers or gateway computers joining the overlay network, or the like.

In one or more of the various embodiments, monitors may be arranged to monitor various devices in the overlay networks. In some embodiments, such monitors may target: single device; a device group; all devices behind a given gateway computer; all devices behind all gateway computers that are associated with defined group; overlay network devices; overlay network gateway computers; or the like. In one or more of the various embodiments, a device monitor associated with a given device may be performed by that device's parent gateway computer. If a device moves between one or more gateway computers the monitoring responsibilities may be shifted to the new gateway computer. In some embodiments, device monitors may perform active or passive monitoring. Active monitoring may include ping, traceroute, custom HTTP requests, or the like. While passive monitoring may include counters on bitflows per device through the overlay network, or the like.

In one or more of the various embodiments, the management platform computer may support one or more monitoring events, such as: the occurrence of a new monitoring data result for one or more metrics; the occurrence of a metric value above a threshold; the occurrence of a metric value below a threshold; string matches in overlay network traffic; TTL seconds elapsed without a "positive" result (e.g., lack of a ping response for 3× the ping iteration).

In one or more of the various embodiments, the monitoring engines running on gateway computers or management platform computers may be arranged to detect similar events being sent over and over to prevent flooding of the event listeners of the various involved event engines. Also, in one or more of the various embodiments, arbitrary data may be sent back to trigger other events or actions.

Other examples, include user-definable actions based on events, such as: alert user in GUI; write to a log; user-defined HTTP timeouts; or orchestration actions, such as, making configuration changes, or executing public API calls to an overlay network engine, management platform engine, or the like, or calls to external APIs; create alerts that must be resolved by an administrator; fabrication of one or more monitoring events; or the like.

In one or more of the various embodiments, an arbitrary, ordered sequence of actions may be specified per event type. In some embodiments, hooks for a scripting language may be provided as well as GUI based rule-builders.

In one or more of the various embodiments, orchestrations actions may include: enable or disable network communications for a gateway computer, group of gateway computers, or portions of the overlay network; enable or disable MAC lockdown for a device, node computer or groups of devices or node computers; add or remove device groups from an overlay network; enable or disable trust between device groups in an overlay network; add or remove a node computer or device to a device group; modify smart device group rules; create or delete portions or routes in an overlay network; edit the underlying network routing table; or the like. In some embodiments, actions may be targeted at users or user activity, such as, termination of one or more client browser sessions; disabling a user from API access; sending email to a user; or the like.

In one or more of the various embodiments, logging actions may include: logging to system logs; logging information to a PCI audit log; logging availability or performance that may include records of transition between up/down, key performance numbers, or the like; export to time-series databases; or the like.

In one or more of the various embodiments, one or more monitoring events may be designated as durable events that are guaranteed to be processed. Likewise, events that are not durable are not guaranteed to be processed. For example: security or PCI related events may be classified as durable guaranteeing that resulting logs and actions will eventually take place. In one or more of the various embodiments, event engines or monitoring engines may be arranged to store durable events such that may persist though reboots or other failures. In contrast, for example, some events, such as, basic performance metric events may not be durable. Accordingly, if the system became bogged down the non-durable event may be flushed (rather than resulting in completed actions) to allow for more important jobs to complete.

In one or more of the various embodiments, monitoring engines on management platform computers may also source events related to its operations. These may be processed as any other event, and may result in alerts or orchestrations For example: too many login attempts by a user; resource usage warnings; configuration validation errors or warnings, especially around route collisions; or the like.

In one or more of the various embodiments, monitoring rules may be arranged to detect flapping to prevent the user from being overwhelmed by an event that is occurring over and over. Flapping related rules may include, tuning based on monitor engine settings; option to disable actions while a monitor is flapping (on per monitor basis); minimum or maximum metrics for determining if a monitor is in flapping state; or the like.

In one or more of the various embodiments, monitoring engines or event engines may be arrange to detect or guard against multiple event detection or multiple alerts detection. Accordingly, in some embodiments, multiple events may be correlated into a single event if there may be multiple monitors being triggered simultaneously because of the same underlying metric or activity. For example, gateway computer that goes offline may cause an offline alert. However, the gateway computer may be associated with a gateway computer group that is associated with a monitor that generates alerts if any of its members are offline, so if the gateway computer goes offline, it would cause two alerts for the one gateway computer going offline.

In one or more of the various embodiments, monitors may be provided to monitor the state of security software on a given node computer, gateway computer, relay computer, or management platform computer that confirm installed version numbers, applied patches, virus software updates, or the like.

Generalized Operations

Figure 8:
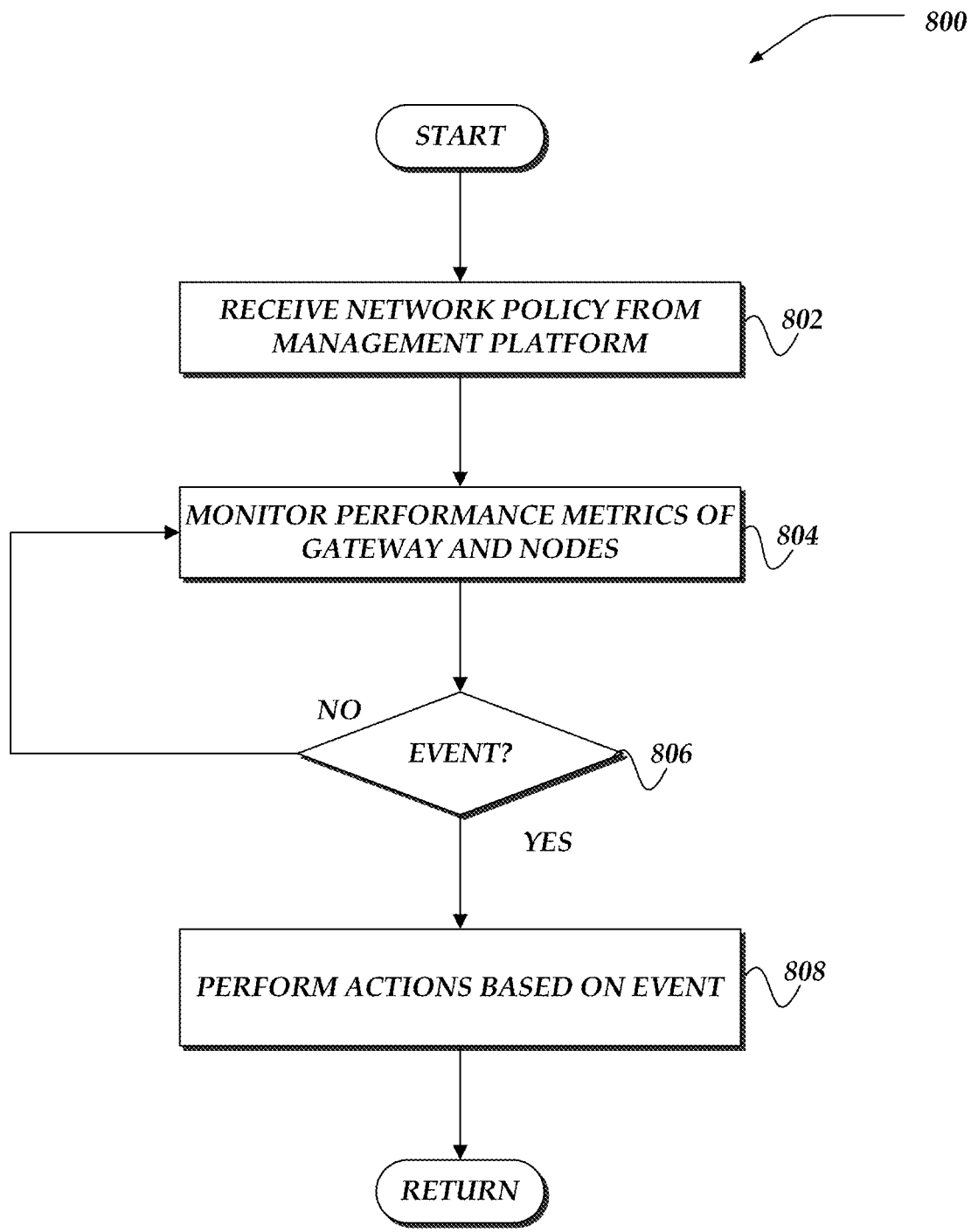
FIG. 8 illustrates an overview flowchart of a process for monitoring overlay networks in accordance with at least one of the various embodiments.
Figure 9:
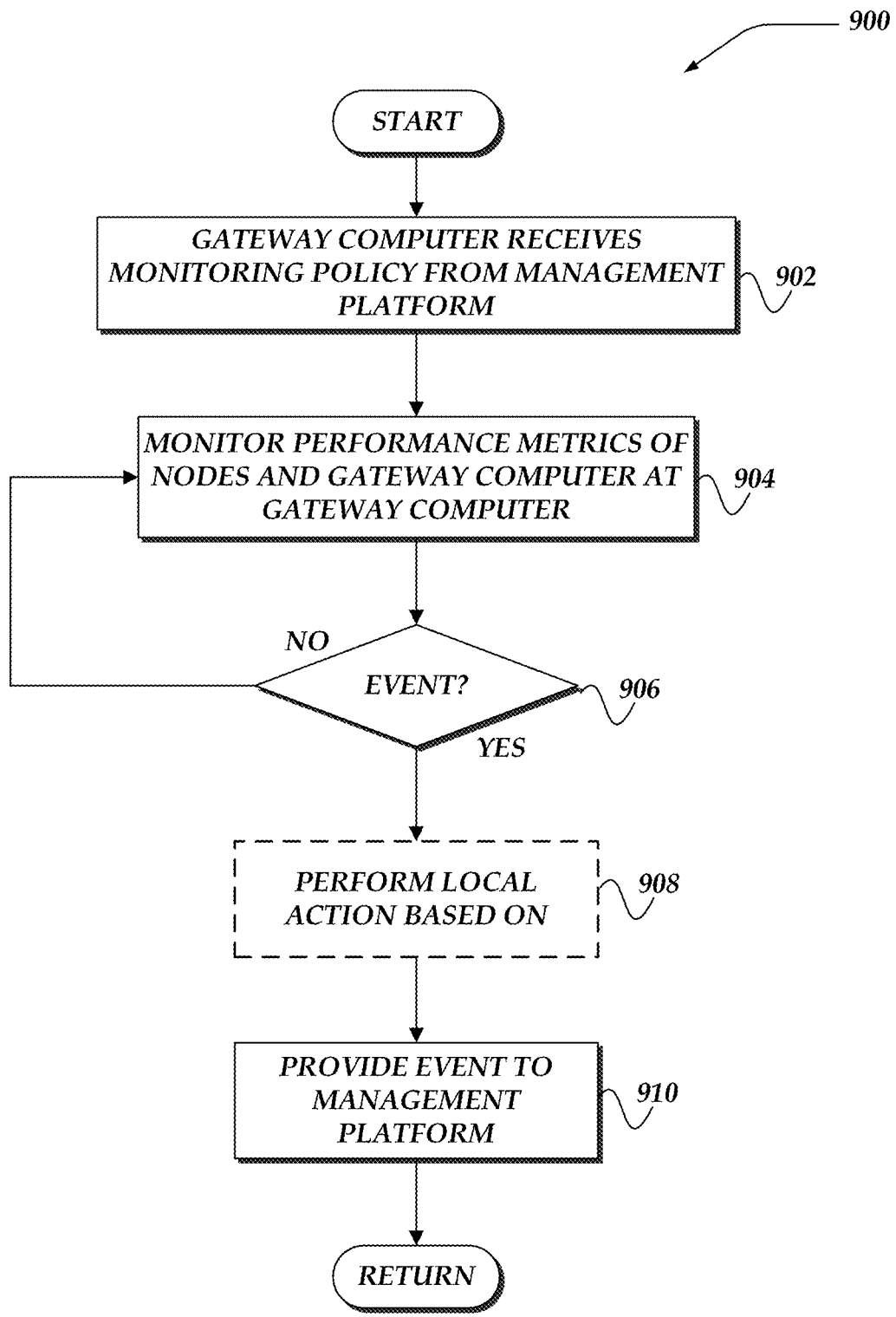
FIG. 9 illustrates a flowchart of a process for monitoring overlay networks at gateway computers in accordance with at least one of the various embodiments.
Figure 10:
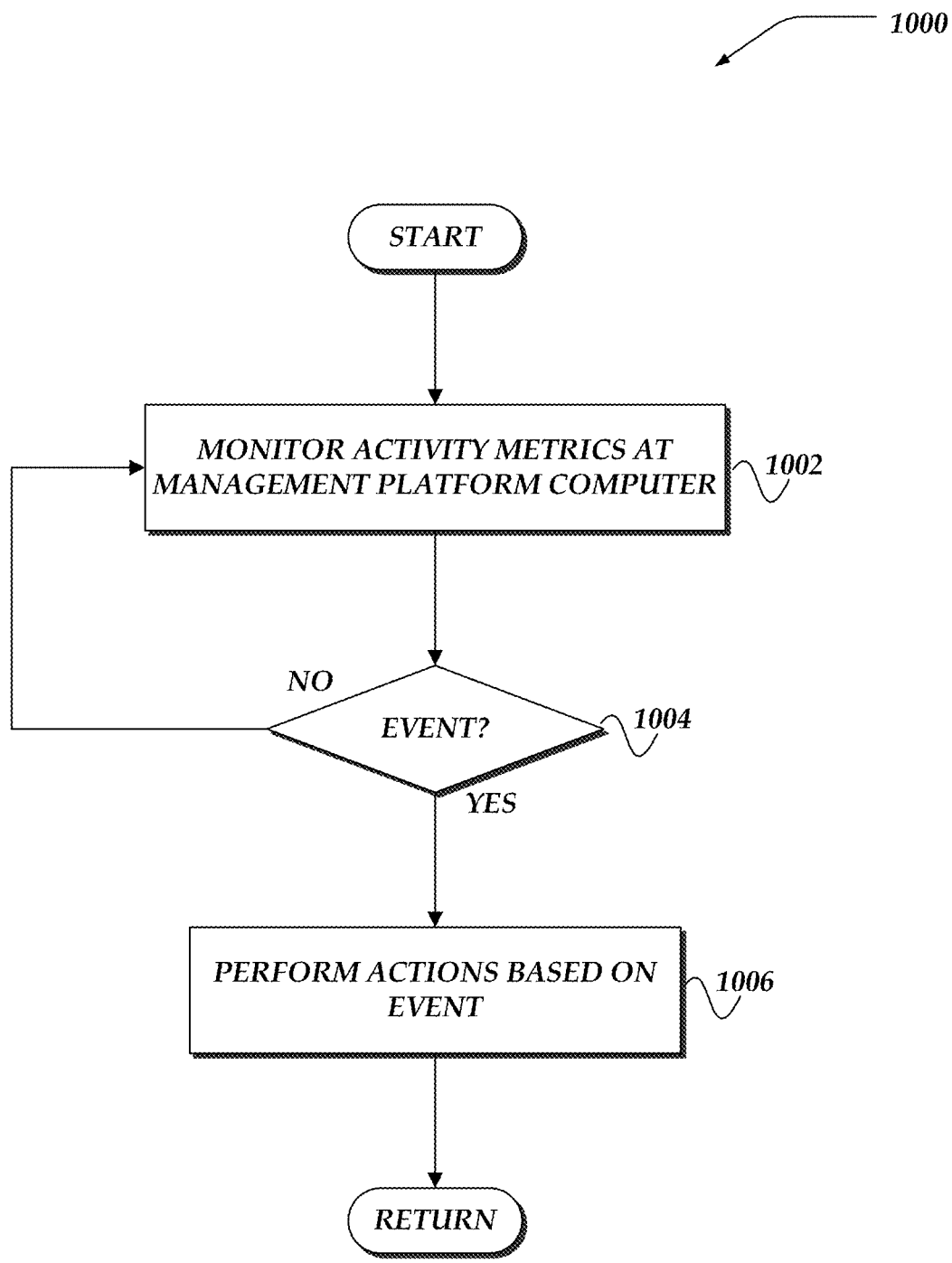
FIG. 10 illustrates a flowchart of a process for monitoring overlay networks at management platform computers in accordance with at least one of the various embodiments.

FIGS. 8-10 represent the generalized operation of monitoring overlay networks in accordance with at least one of the various embodiments. In at least one of the various embodiments, processes 800, 900 and 1000 described in conjunction with FIGS. 8-10 may be implemented by or executed on one or more processors of a relay computer, a gateway computer, or a management platform server, such as network computer 300 of FIG. 3. In other embodiments, these processes, or portions thereof, may be implemented by or executed on one or more processors of a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in at least one of the various embodiments, the processes described in conjunction with FIGS. 8-10 may be used for monitoring overlay networks in accordance with at least one of the various embodiments or architectures such as those described in conjunction with FIGS. 4-7. Further, in at least one of the various embodiments, some or all of the action performed by processes 800, 900, or 1000 may be executed in part by overlay network engine 322, management platform engine 324, event engine 325, monitoring engine 326, gateway engine 327, or the like, or combination thereof.

FIG. 8 illustrates an overview flowchart of process 800 for monitoring overlay networks in accordance with at least one of the various embodiments. In one embodiment, process 800 may be implemented by one or more of management platform computer 116, gateway computers 118, relay computers 120 of FIG. 1, or the like. After a start block, at block 802, in at least one of the various embodiments, overlay network policy may be obtained from a management platform server, such as, management platform server computer 116 of FIG. 1. In one or more of the various embodiments, the policies may define allowed routes between gateway computers, e.g. a whitelist of allowed connections. Further, in one or more of the various embodiments, management platform computers may be arranged to provide monitoring policy information in the form of one or more monitoring rules that may be employed by the one or more monitoring engines that may be instantiated by one or more gateway computers. Also, in one or more of the various embodiments, management platform computers may be arranged to provide event or action policy information in the form of one or more event rules or action rules that may be employed by the one or more event engines that may be instantiated by one or more gateway computers.

In one or more of the various embodiments, management platform computers may be arranged to provide a user-interface or configuration system that enable users to define one or more monitoring rules or event rules for one or more gateway computers and the management platform computer itself. In some embodiments, one or more management platform computers may be arranged to provide a graphical user interfaces that enables rules to be turned on or off, threshold values to be set, limits or trigger values to be defined, or the like. Also, in some embodiments, one or more management platform computers may be arranged to provide a configuration facility that enables rules to be turned on or off, threshold values to be set, limits or trigger values to be defined, or the like, using scripts, programs, configuration files, or the like, or combination thereof.

At block 804, in one or more of the various embodiments, the one or more monitoring engines may be arranged to monitor one or more performance metrics that may be associated with one or more gateway links, gateway computers, management platform computers, node computers, network segments, or the like. In some embodiments, the one or more monitoring engines may be arranged to one or more of the underlying network elements as well (e.g., native or physical networks), such as, routers, switches, network ports, network address, network flows, or the like.

In one or more of the various embodiments, one or more gateway computers may include a monitoring engine that may be arranged to execute various performance monitoring operations to evaluate the quality or health of each monitored item. As discussed herein, some monitoring operations may be specific to one or more gateway links or types of gateway links, gateway computers, applications, node computers, native network portions, overlay network portions, or the like. Also, in one or more of the various embodiments, some monitoring operations may be specific for a particular type of content, source/destination, time of day, or the like. In some embodiments, one or more monitoring operations may be associated with inputs provided by one or more sensors, such as, temperature sensors, vibration sensors, current/voltage sensors, pressure sensors, or the like.

In one or more of the various embodiments, the one or more monitoring operations may produce one or more performance metrics that may be evaluated using the one or more monitoring rules to determine if an event should be generated.

At decision block 806, in one or more of the various embodiments, if the monitoring engine determines that an event should be generated, it may generate the event and control may flow to block 808; otherwise, control may loop back to block 804 for continued monitoring.

At block 808, in one or more of the various embodiments, one or more actions may be performed based on the event. In one or more of the various embodiments, event engines may be arranged to map events to one or more actions. Note, in some embodiments, each action may comprise one or more operations, steps, phases, or the like. For example, one action may be a single operation, such as, log the event information to a log file while another action may be initiating a multiple step workflow or process.

In one or more of the various embodiments, most events may be used asynchronously, in the sense that the monitoring engine that provides an event does not wait for acknowledgment or a response. However, in some embodiments, one or more monitoring events may be synchronous in the sense that the monitoring engine may be arranged to wait for an acknowledgement, confirmation, or response from the event engines that received the one or more synchronous events. Accordingly, in some embodiments, monitoring events may be associated with a flag or property that indicates the monitoring engine should or is recommended to wait for an acknowledgement, confirmation, or response from the event engines for those events.

Next, control may be provided to a calling process.

FIG. 9 illustrates a flowchart of process 900 for monitoring overlay networks at gateway computers in accordance with at least one of the various embodiments. After a start block, at block 902, in one or more of the various embodiments, a gateway computer may receive monitoring information from a management platform computer. In some embodiments, the monitoring information may include one or more monitoring policies (monitoring rules) for determining which metrics or activities to monitor as well as the conditions for determining if a monitoring event should be generated. In some embodiments, monitoring policy may be provided if the gateway computer registers itself with the management platform computer. In some embodiments, gateway computers may be pre-installed with one or more monitoring policies that may be executed in the event that a management platform computer is unavailable or otherwise inaccessible.

In one or more of the various embodiments, gateway computers may be arranged to instantiate a monitoring engine to process or interpret the available monitoring policies. In some embodiments, one or more monitoring engines may be arranged to periodically interrogate the management platform computer to check for changes to the monitoring policies. Alternatively, in some embodiments, management platform computers may be arranged to automatically push monitoring policies to one or more gateway computers if they are changed. Similarly, in some embodiments, one or more management platform computers may be arranged to notify one or more gateway computers that its monitoring policies have changed, enabling the one or more gateway computers to request the updated monitoring policies if they are ready to receive them.

At block 904, in one or more of the various embodiments, the monitoring engine may be arranged to monitor one or more performance metrics or activities that may be associated with the gateway computer or one or more associated node computers. In one or more of the various embodiments, monitoring engines may accumulate values for one or more metrics based on current monitoring policy. In one or more of the various embodiments, one or more metrics may be used for computing one or more compound metrics that may be generated based on one or more low level metrics. For example, an average-bit-rate-per-minute metric may be based on multiple measurements of the same raw metric value may be averaged over a minute.

Likewise, in one or more of the various embodiments, an individual measured raw metric value may contribute to more than one monitoring metric. Accordingly, in some embodiments, the same raw metric may be used for generate monitoring metrics that represent averages, rates, or total accumulation. For example, a raw bit rate values may contribute to monitoring metrics, such as, total-bytes-sent, average-bytes-per-minute, current-byte-rate, or the like.

At decision block 906, in one or more of the various embodiments, if the monitoring engine determines that one or more events should be generated, control may flow to block 908; otherwise control may loop back to block 904 for continued monitoring. In one or more of the various embodiments, the monitoring engine may be arranged to compare the monitoring metric values to one or more conditions or thresholds that are associated with one or more monitoring events. In one or more of the various embodiments, conditions may include two or more sub-conditions. Or, generally, conditions may include multiple tests, branching, or the like, and may be mini-programs that perform arbitrarily complex analysis to determine if a monitoring event should be generated. Also, in one or more of the various embodiments, a change in one raw metrics or monitoring event may trigger one or more monitoring events to be generated.

At block 908, in one or more of the various embodiments, optionally, the monitoring engine may be arranged to provide the one or more monitoring events to a locally instantiated event engine. Accordingly, the event engine may be arranged to interpret the one or more monitoring events to determine if one or more actions should be taken in response to the one or more monitoring events. In some embodiments, the local event engine may be an event engine that is designated for use by a given monitoring engine or gateway computer. Accordingly, in some embodiments, the event engine may be instantiated on another network computer or cloud computer rather than being limited to being instantiated on the gateway computer itself.

In one or more of the various embodiments, employing the local event engine avoids the overhead or latency that would be required if the event was sent to a remote event engine (e.g., an event engine on a management platform computer) that may be intermittently accessible or accessible only over slow or congested network links. Further, in one or more of the various embodiments, local event engines may generate actions that result in other events being generated. For example, in some embodiments, a local event engine may be arranged to consume event A locally, and after N event A's are consumed the local event engine may generate event B which may be forwarded to another event engine (e.g., an event engine on the management platform computer) for processing.

In one or more of the various embodiments, some events handled or processed by a local event engine may be arranged to be consumed at the local event engine and not propagated further while other events may be arranged to be processed at the local event engine and also forwarded to other event engines, such as, an event engine running on the management platform computer.

This block is considered optional because in some embodiments one or more monitoring engines may be arranged to exclude some or all events from local processing at a local event engine.

At block 910, in one or more of the various embodiments, the monitoring engine may be arranged to provide the one or more monitoring events to a management platform computer. In some embodiments, the one or more monitoring events may be provided to an event engine instantiated on a management platform computer for determining if one or more actions should be taken in response the one or more monitoring events.

In some embodiments, the event engine described as being instantiated on the management platform computer may be an event engine that is designated for use by a given monitoring engine or management platform computer. Accordingly, in some embodiments, the event engine may be instantiated on another network computer or cloud computer rather than being limited to being instantiated on the management platform computer itself.

Next, control may be returned to a calling process.

FIG. 10 illustrates a flowchart of process 1000 for monitoring overlay networks at management platform computers in accordance with at least one of the various embodiments. After a start block, at block 1002, in one or more of the various embodiments, one or more monitoring engines may be instantiated on a management platform computer. The one or more monitoring engines may be arranged to monitor one or more performance metrics or activities.

In one or more of the various embodiments, the one or more performance metrics or activities may be associated with one or more gateway computers, network portions, applications, services, or the like, that may be associated with the overlay network. In some embodiments, the management platform computer may be arranged to monitor two or more overlay networks.

As described above, the management platform computer may be associated with a monitoring engine and an event engine that may be instantiated on the management platform computer or the monitoring engine or event engine may be running on another network computer. If the monitoring engine is running on another computer, the management platform computer may be arranged to forward monitoring information for monitoring (e.g., one or more raw metrics, network packets, or the like) to one or more remote monitoring engines or one or more event engines.

At decision block 1004, in one or more of the various embodiments, if the monitoring engine determines that one or more monitoring events should be generated and provided to the event engine, control may flow to block 1006; otherwise, control may loop back to block 1002 to continue monitoring one or more performance metrics or activities.

At block 1006, in one or more of the various embodiments, an event engine may be arranged to obtain the one or more monitoring events and perform one or more actions based on the one or more monitoring events. The event engine associated with the management platform computer may perform similar operations as described above in FIG. 9 for mapping events to actions and perform actions. However, in one or more of the various embodiments, the event engine running on the management platform computer may have access or visibility of metrics or network information that is different than the metrics or network information that is available to a gateway computer.

Next, control may be returned to a calling process.

It will be understood that each block of the flowchart the illustrations, and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by one or more processors to cause a series of operational steps to be performed by the one or more processors to produce a computer-implemented process such that the instructions, which execute on the one or more processors to provide steps for implementing the actions specified in the flowchart block or blocks. The computer program instructions may also cause at least some of the operational steps shown in the blocks of the flowcharts to be performed in parallel. Moreover, some of the steps may also be performed across more than one processor, such as might arise in a multi-processor computer system or multi-core computer system. In addition, one or more blocks or combinations of blocks in the flowchart illustration may also be performed concurrently with other blocks or combinations of blocks, or even in a different sequence than illustrated without departing from the scope or spirit of the invention.

Additionally, in one or more steps or blocks, may be implemented using embedded logic hardware, such as, an Application Specific Integrated Circuit (ASIC), Field Programmable Gate Array (FPGA), Programmable Array Logic (PAL), or the like, or combination thereof, instead of a computer program. The embedded logic hardware may directly execute embedded logic to perform actions some or all of the actions in the one or more steps or blocks. Also, in one or more embodiments (not shown in the figures), some or all of the actions of one or more of the steps or blocks may be performed by one or more hardware microcontrollers instead of a CPU. In at least one embodiment, the one or more microcontrollers may directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing communication over one or more networks using one or more network computers, wherein execution of instructions by the one or more network computers perform the method comprising:
    monitoring network traffic for the one or more networks, wherein the network traffic is associated with one or more network addresses of a plurality of physical networks and is further associated with one or more gateway identifiers (GIDs) for one or more gateway computers in one or more physical networks that are private and an underlying part of one or more associated overlay networks that are public and employed by one or more relay computers in one or more physical networks that are public to establish one or more intermediate connections between the one or more gateway computers to prevent direct access and visibility of the one or more private and public physical networks and their associated network traffic by one or more nodes that are members of the overlay network, wherein the one or more nodes are interconnected endpoints in the overlay network which operates as a logical network that provides an abstraction layer to hide the underlying part of the one or more physical networks from members of the overlay network;
    generating one or more events based on one or more affirmative comparisons of one or more metrics for the network traffic associated with the one or more GIDs and the one or more gateway computers to one or more event rules; and
    employing the one or more events to execute one or more actions based on the one or more events.

2. The method of claim 1, further comprising:
    employing a network computer as a management platform computer that provides one or more monitoring rules and one or more event rules; and
    wherein monitoring the network traffic is based on the one or more monitoring rules, and wherein executing the one or more actions is based on the one or more event rules.

3. The method of claim 1, further comprising:
    determining one or more node computers that connect to the one or more gateway computers; and
    generating an event that includes information about the node computer, including, one or more of the one or more GIDs, a media access control (MAC) address, a network address, a hostname, a cryptographic key, or a security certificate.

4. The method of claim 1, further comprising:
    employing the one or more relay computers configured in an overlay network to provide a communication path between two or more gateway computers in the overlay network.

5. The method of claim 1, further comprising employing one or more characteristics of the one or more events to execute the one or more actions local to a network computer that is monitoring the network traffic.

6. The method of claim 1, further comprising monitoring one or more devices in an overlay network, wherein the devices include one or more of an individual network device, a group of network devices, or at least one network device that is associated with the one or more gateway computers.

7. The method of claim 1, wherein executing the one or more actions further comprises:
    executing one or more of an ordered sequence of sub-actions that are based on a type of the one or more events, or one or more scripts.

8. A processor readable non-transitory storage media that includes instructions for managing communication over one or more networks, wherein execution of the instructions by the one or more network computers perform the method comprising:
    monitoring network traffic for the one or more networks, wherein the network traffic is associated with one or more network addresses of a plurality of physical networks and is further associated with one or more gateway identifiers (GIDs) for one or more gateway computers in one or more physical networks that are private and an underlying part of one or more associated overlay networks that are public and employed by one or more relay computers in one or more physical networks that are public to establish one or more intermediate connections between the one or more gateway computers to prevent direct access and visibility of the one or more private and public physical networks and their associated network traffic by one or more nodes that are members of the overlay network, wherein the one or more nodes are interconnected endpoints in the overlay network which operates as a logical network that provides an abstraction layer to hide the underlying part of the one or more physical networks from members of the overlay network;

generating one or more events based on one or more affirmative comparisons of one or more metrics for the network traffic associated with the one or more GIDs and the one or more gateway computers to one or more event rules; and employing the one or more events to execute one or more actions based on the one or more events.

9. The media of claim 8, further comprising:
employing a network computer as a management platform computer that provides one or more monitoring rules and one or more event rules; and
wherein monitoring the network traffic is based on the one or more monitoring rules, and wherein executing the one or more actions is based on the one or more event rules.

10. The media of claim 8, further comprising:
determining one or more node computers that connect to the one or more gateway computers; and
generating an event that includes information about the node computer, including, one or more of the one or more GIDs, a media access control (MAC) address, a network address, a hostname, a cryptographic key, or a security certificate.

11. The media of claim 8, further comprising:
employing the one or more relay computers configured in an overlay network to provide a communication path between two or more gateway computers in the overlay network.
employing one or more relay computers configured in the overlay network to provide a communication path between two or more gateway computers in the overlay network.

12. The media of claim 8, further comprising employing one or more characteristics of the one or more events to execute the one or more actions local to a network computer that is monitoring the network traffic.

13. The media of claim 8, further comprising monitoring one or more devices in an overlay network, wherein the devices include one or more of an individual network device, a group of network devices, or at least one network device that is associated with the one or more gateway computers.

14. The media of claim 8, wherein executing the one or more actions further comprises:
executing one or more of an ordered sequence of sub-actions that are based on a type of the one or more events, or one or more scripts.

15. A network computer for managing communication over one or more networks, comprising:
a memory that stores at least instructions; and
one or more processors that execute instructions that perform actions, including:
monitoring network traffic for the one or more networks, wherein the network traffic is associated with one or more network addresses of a plurality of physical networks and is further associated with one or more gateway identifiers (GIDs) for one or more gateway computers in one or more physical networks that are private and an underlying part of one or more associated overlay networks that are public and employed by one or more relay computers in one or more physical networks that are public to establish one or more intermediate connections between the one or more gateway computers to prevent direct access and visibility of the one or more private and public physical networks and their associated network traffic by one or more nodes that are members of the overlay network, wherein the one or more nodes are interconnected endpoints in the overlay network which operates as a logical network that provides an abstraction layer to hide the underlying part of the one or more physical networks from members of the overlay network;

generating one or more events based on one or more affirmative comparisons of one or more metrics for the network traffic associated with the one or more GIDs and the one or more gateway computers to one or more event rules; and employing the one or more events to execute one or more actions based on the one or more events.

16. The network computer of claim 15, further comprising:
employing a network computer as a management platform computer that provides one or more monitoring rules and one or more event rules; and
wherein monitoring the network traffic is based on the one or more monitoring rules, and wherein executing the one or more actions is based on the one or more event rules.

17. The network computer of claim 15, further comprising:
determining one or more node computers that connect to the one or more gateway computers; and
generating an event that includes information about the node computer, including, one or more of the one or more GIDs, a media access control (MAC) address, a network address, a hostname, a cryptographic key, or a security certificate.

18. The network computer of claim 15, further comprising:
employing the one or more relay computers configured in an overlay network to provide a communication path between two or more gateway computers in the overlay network.

19. The network computer of claim 15, further comprising monitoring one or more devices in an overlay network, wherein the devices include one or more of an individual network device, a group of network devices, or at least one network device that is associated with the one or more gateway computers.

20. The network computer of claim 15, wherein executing the one or more actions further comprises:
executing one or more of an ordered sequence of sub-actions that are based on a type of the one or more events, or one or more scripts.

* * * * *